United States Patent [19]
Soejima et al.

[11] Patent Number: 5,713,027
[45] Date of Patent: Jan. 27, 1998

[54] METHOD AND APPARATUS FOR CONTROLLING THE SHUTDOWN OF COMPUTER SYSTEMS BY USING SERVICE UTILIZATION INFORMATION AND EXAMINING A DEPENDENCY RELATIONSHIP BETWEEN THE COMPUTERS

[75] Inventors: Ken'ichi Soejima, Kawasaki; Hitoshi Ueno, Zama; Narishige Morimoto, Kawasaki; Masaaki Ohya, Yokohama, all of Japan

[73] Assignee: Hitachi, Ltd., Tokyo, Japan

[21] Appl. No.: 450,119

[22] Filed: May 25, 1995

[30] Foreign Application Priority Data

May 26, 1994 [JP] Japan .................. 6-136512

[51] Int. Cl.⁶ .................................................. G06F 13/00
[52] U.S. Cl. .............. 395/750; 395/182.22; 395/183.13; 395/200.12; 395/200.18
[58] Field of Search .................. 340/505, 551.01; 395/180, 200.03, 200.18, 800, 828, 750, 182.22, 200.12, 183.13

[56] References Cited

U.S. PATENT DOCUMENTS

| | | | |
|---|---|---|---|
| 4,400,694 | 8/1983 | Wong et al. | 340/505 |
| 4,747,041 | 5/1988 | Engel et al. | 395/750 |
| 4,974,151 | 11/1990 | Advani et al. | 395/828 |
| 5,124,909 | 6/1992 | Blakely et al. | 395/200.18 |
| 5,287,453 | 2/1994 | Roberts | 395/200.03 |
| 5,307,496 | 4/1994 | Ichinose et al. | 395/650 |
| 5,351,186 | 9/1994 | Bullock et al. | 364/401 |
| 5,408,610 | 4/1995 | Arakawa | 395/600 |
| 5,432,715 | 7/1995 | Shigemastsu et al. | 364/551.01 |
| 5,457,806 | 10/1995 | Kitamura | 395/800 |
| 5,483,652 | 1/1996 | Sudama et al. | 395/600 |
| 5,504,880 | 4/1996 | Hirosawa et al. | 395/180 |

FOREIGN PATENT DOCUMENTS 4-260694  9/1992  Japan .

OTHER PUBLICATIONS

Hal Stern, "Managing NFS and NIS", O'Reilly & Associates, 1991.
HP 9000 Computer Manual "HP-UX Reference vol. 3 (Release 9.0)", Hewlett Packard Company.

*Primary Examiner*—Thomas C. Lee
*Assistant Examiner*—Po C. Huang
*Attorney, Agent, or Firm*—Antonelli, Terry, Stout & Kraus, LLP

[57] ABSTRACT

A service utilization information collection apparatus in a system including a plurality of computers interconnected through a network acquires names of computers which utilize services provided by a server machine and service utilization status from any one of the computers in the system, and includes a user command which may be executed in any one of the computers, and a service monitor and a local service monitor. A service to be monitored and a name of the server which provides the service are inputted to the user command which is sent to the service monitor. The service monitor issues a service utilization information collection request to the local service monitor operating on each of the computers. The service utilization information collected by the local service monitor is sent to the user through the service monitor and the user command.

11 Claims, 21 Drawing Sheets

METHOD AND APPARATUS FOR CONTROLLING THE SHUTDOWN OF COMPUTER SYSTEMS BY USING SERVICE UTILIZATION INFORMATION AND EXAMINING A DEPENDENCY RELATIONSHIP BETWEEN THE COMPUTERS

BACKGROUND OF THE INVENTION

The present invention generally relates to a computer system, and more particularly the method and apparatus for collecting service utilization information provided by a computer and for controlling the shut down of a computer system utilizing such method and apparatus.

An NFS service is known as one service which a computer provides through a communication line ("Managing NFS and NIS" Chapter 5, Hal Stern O'REILLY & ASSOCIATES 1991). The NFS (Network File System) allows a file system mounted on a first computer connected to a communication line to be handled as a file system mounted on a second computer connected to the communication line.

A command to check whether a computer utilizes an NFS service such as a show-mount command (Hewlett Packard HP 9000 Computer Manual "HP-UX Reference Vol. 3 (Release 9.0)", show-mount) is prepared.

A user may determined whether or not a computer utilizes the NFS service by a server computer by entering the showmount command to the server computer. This is attained by the show-mount command which reads mount information held by mounted system which is one of programs for the NFS service. When a mount request is issued by a client, the mounted system adds an entry of a file system to be mounted to the mount information. This entry is deleted by an unmount request from the client.

As another network service, NIS (Network Information Service) is known ("Managing NFS and NIS" Chapter 2, Hal Stern O'REILLY & ASSOCIATES 1991). In the NIS, user information and system information are shared among computers primarily connected to LAN. A system which implements the NIS may be considered as a kind of information retrieval system.

In the system which implements the NIS, each client computer is provided with a command to identify a NIS server computer to which it refers but means for identifying a client computer of the NIS from the server computer are not provided.

As other network service, TELNET service is known. The TELNET provides a remote terminal function for logging in other computer through a communication line. A user of the computer may determine which computer logs in the computer by the telnet command by using a who command (HP 9000 Computer Manual "HP-UX Reference Vol. 1 (Release 9.0)", who), a ps command (HP 9000 Computer Manual "HP-UX Reference Vol. 1 (Release 9.0)" ps) and a last command (HP 9000 Computer Manual "HP-UX Reference Vol. 3 (Release 9.0), last).

When the who command is executed, login user names who are currently logged into the computer and system names corresponding to the users' are displayed. The ps command displays a process status and names of users who are executing the process. The ps command displays all process information including a background process. The last command displays a history of users who have logged in.

A netstat command (HP 9000 Computer manual "HP-UX Reference Vol. 1 (Release 9.0)", netstat) is a command used to acquire information regarding network communication by a computer.

Many services, among others the TELNET use a socket such as a communication interface. An example of such services is a file transferring ftp ( HP 9000 Computer Manual "HP-UX Reference Vol. 1 (Release 9.0)", ftp).

In JP-A-4-260964, when an operation of a system including a plurality of computers which are in a client-server relationship is to be shut down and if an inter-computer file system is mounted, the system is shut down after the mount is automatically released. However, it does not discloses detail of a method for checking the mount relation.

The mount information held by the mounted system is updated by a mount/unmount request from a client. Accordingly, if a client that issued a mount request is shut down by a fault before it issues an unmount request, the mount information on that client is not updated. Accordingly, a client that does not actually utilize the NFS service is subsequently displayed by the show-mount command.

As described above, in the NIS implemented system, means for displaying the client machine which currently utilizes the NIS service are not provided. If the computer which provides the NIS service is inadvertently shut down, the work in the client computer which utilizes the service is affected.

Since the who, ps and last commands do not allow the display of the system name relating to the background process, it is not possible to identify the user machine that logs in by using the TELNET service.

Since the netstat command outputs all information indicating the socket relation with other computers, extracting necessary information (the user system name relating to the user who logs in by using the TELNET service) from the output information is complex.

Since the means for simply, exactly and rapidly identifying the client computer that used the service provided by the server computer is not provided, when the operation of the network is to be shut down, processes which impart burden to the system user such as checking if there is a user who is using the service of other computers and shutting down in the order of the client computers and the server computer are required.

SUMMARY OF THE INVENTION

It is an object of the present invention to facilitate the collection of service utilization information provided by a computer.

It is another object of the present invention to reduce the work required to shut down a computer system comprising a plurality of computers.

In accordance with the present invention, each computer are provided with local service monitor means for collecting service utilization information. Service monitor means are provided in at least one of the computers to collect the service utilization information by accepting a user request, communicating with the local service monitor means and executing commands and functions. User command processing means for processing a user input command to a service monitor is also provided.

The user command processing means issues a request to collect service utilization information including computer names and service names provided by the computers, receives the collected service utilization information and displays it. The service monitor means is operated on at least one computer. The local service monitor means are operated on all computers. The service monitor means and the local service monitor means operate cooperatively to collect the service utilization information.

The collection of the service utilization information includes ordinary check, periodic check and event driven check information.

In the ordinary check, the service monitor means sends a request to collect information from the user command processing means to the local service monitor means, which collects the requested information in the computer and sends it to the service monitor means. The service monitor means sends the information acquired from the local service monitor means to the user command processing means.

In the periodic check, the local service monitor means periodically collects the information relating to the name of computer which provides the service utilized by the computer and the service thereof, and sends it to the service monitor means. The service monitor means holds the service utilization information. When the user command processing means issues an information collection request, the service monitor means extracts the requested information from the service utilization information which it holds and sends it to the user command processing means.

In the event driven check, instead of providing the local service monitor means, a command or function to modify the service configuration and inform the service monitor means of the modified configuration is provided. When the command or function to modify the service configuration is executed, a change is sent from the function or command to the service monitor means. The service monitor means holds the service utilization information, and when it receives the change, it modifies the service utilization information which it holds in accordance with the change. When an information collection request is issued from the user command processing means, the service monitor means extracts the requested information from the service utilization information which it holds and sends it to the user command processing means.

More particularly, the method for collecting the service utilization information in each computer includes a method for reading a file which contains such information and a method for executing a command or function for collecting such information. Alternatively, a command or function to check a status of a communication line between its own computer and another computer is executed to check the communication line to identify a destination computer name of a communication line which meets a pre-designated condition and a service name provided by that communication line which may be identified by a resource used by the communication line.

The present invention relates to a method for shutting down a computer system comprising two or more computers in which one of the computers provides one or more services to other computers, by shutting down one or more computers in the computer system, which comprises the steps of collecting information on computers which currently utilize the services provided by the computers and the services thereof, referring the collected service utilization information, and, if there is a computer which utilizes the services provided by the computer which is to be shut down, informing that computer of the shutdown, determining if there is an intercomputer dependency relation loop and if there is, deleting a lowest priority dependency relation of a predetermined dependency relation from the service utilization information.

The dependency relation of the computers is examined by using a collection apparatus for the service utilization information of the present invention and the computers are shut down starting from the computer whose service is not utilized by any other computers.

In accordance with the present invention, the service monitor means collects the service utilization information and the user reads the information by using the user command processing means. As one method, that is, the ordinary check for collecting the service utilization information by the service monitor means, the service monitor means checks the local service monitor means on the computer, the local service monitor collects the service utilization information and sends it to the service monitor means.

In another method, that is, the periodic check, the local service monitor periodically sends the entire service utilization information of its own computer or the change from the previously collected service utilization information to the service monitor.

In still another method, that is, the event driven check, the command or function to modify the service configuration and inform the service monitor means of the modified configuration is used so that the change of the service configuration is immediately informed to the service monitor.

DETAILED DESCRIPTION OF THE PREFERRED EMBODIMENTS

Figure 1:
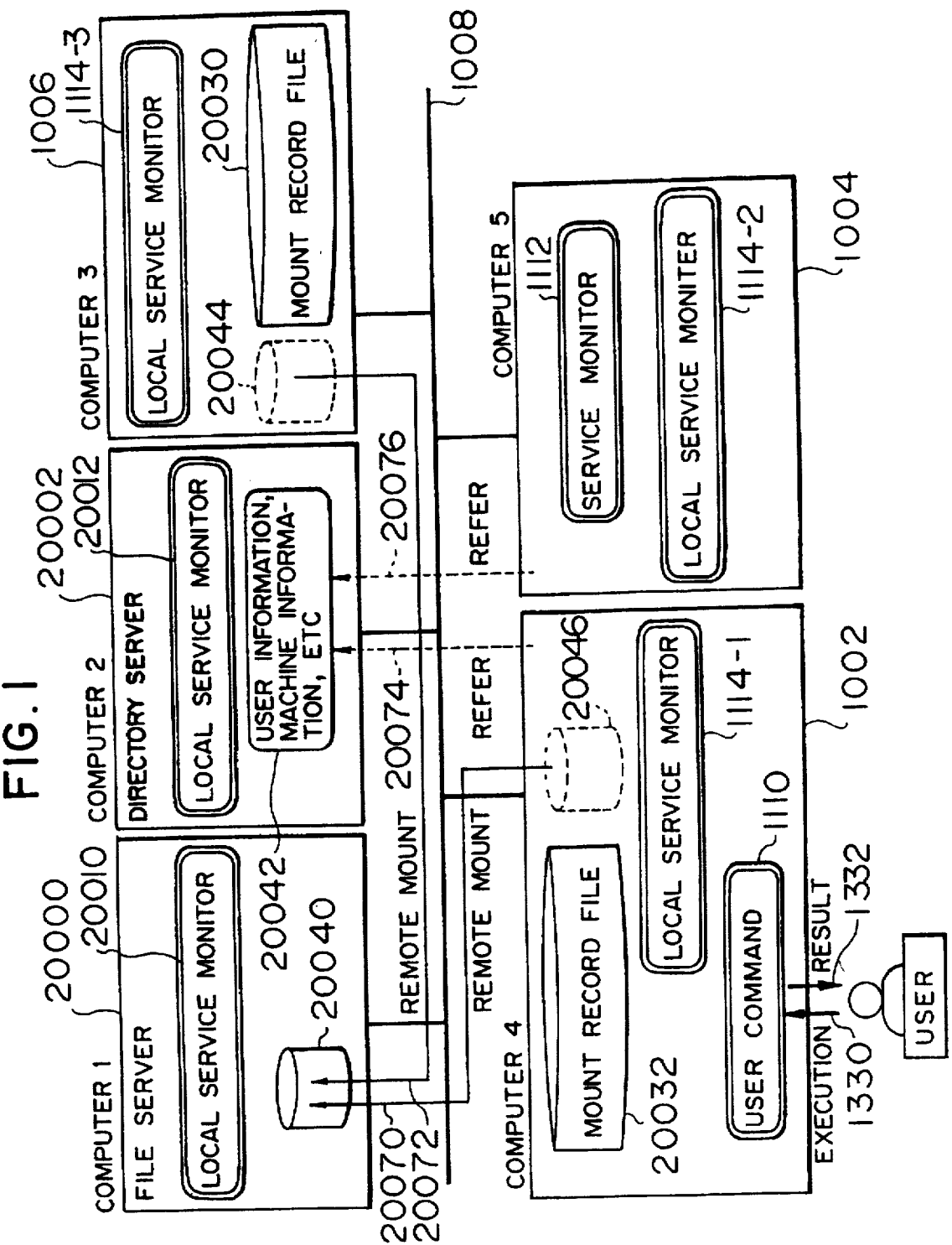
FIG. 1 shows a system configuration of the present invention.

FIG. 1 shows a system configuration of the present invention. Computers 20000, 20002, 1006, 1002 and 1004 are connected to a communication line 1008.

The file server 20000 is used by the computers 1006 and 1002 (20070 and 20072). File server IDs used by the computers are recorded in files of the respective computers 20030 and 20032.

The directory server 20002 provides user information and system information 20042 to other computers. The directory server is responsive to an inquiry request for user information or system information from other computers to send the requested information to the client.

A local service monitor is operated on each computer as required 20010, 20012, 1114-1, 1114-2 and 1114-3. A service monitor 1112 is operated on at least one computer. A user command processing program (hereinafter simply referred to as a user command) 1110 is operated in any of the computers as required, and a user may enter and execute various commands 1330 and receive execution results 1332.

A local file system and a remote file system are now explained.

A disk which the computer may use is classified into a local disk and a remote disk. The local disk is a physical disk 20040 directly connected to its own computer. The remote disk is a virtual disk 20044 and 20046 which is a physical disk connected to another computer and which is accessible by its own computer through a communication line as if it were a physical disk connected to its own computer.

A system for logically managing the local disk and the remote disk is referred to as a file system, a file system on the local disk is referred to as a local file system and a file system on the remote disk is referred to as a remote file system.

In many operating systems (OS), each computer holds information on the local file system and the remote file system mounted thereon in mount record files 20030 and 20032 in the local file system. The mount record file does not include information of other computers mounted on its own computer.

An application of the present invention to the system of FIG. 1 is now explained in detail.

Figure 2:
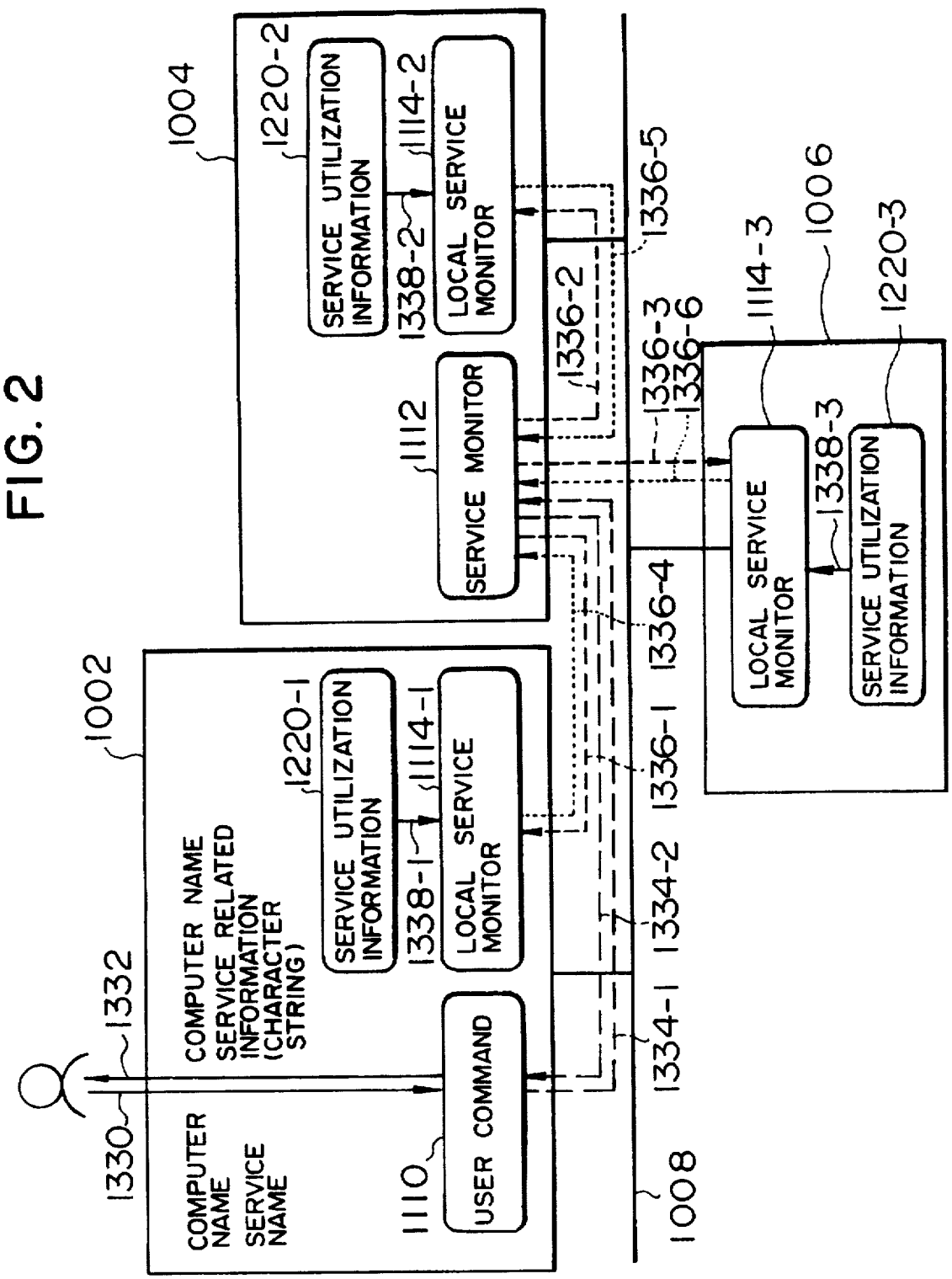
FIG. 2 shows a configuration of a collection apparatus for service utilization information by using an ordinary check.

FIG. 2 shows an ordinary check conducted by the computers 1002, 1004 and 1006.

Information on the services utilized by the computers (service utilization information) 1220-1, 1220-2 and 1220-3 are stored on the computers 1002, 1004 and 1006 and they may be referred to by local service monitors 1114-1, 1114-2 and 1114-3.

It should be understood by those skilled in the art that the number of computers connected to the network, the OS's operating on the computers and the network topology are not limited to those of the present embodiment. In the present embodiment, UNIX (UNIX is a trademark of AT&T Bell Laboratories) is adopted as the OS and the respective computers are connected through a LAN (Local Area network).

In order for a user of the computer 1002 to acquire a name of a computer which utilizes a service provided by the computer 1006 and information on the service, the user enters in a user command 1110 the name of the computer 1006 and the name of the service. A computer which provides the service may be any one of the computers 1002, 1004 and 1006. Similarly, a computer which executes the user command and the service monitor may be any computers. A plurality of computer may provide services. This is applicable to all embodiments which will be described hereinafter as will be readily understood by those skilled in the distributed processing environment.

The user previously enters in the user command 110 the information that the service monitor 1112 operates on the computer 1004. Based on that information, the user command 1110 sends to the service monitor 1112 a send request for the information relating to the name of the computer that utilizes the service of the computer 1006 and the service thereof 1334-1.

Based on the received computer name, the service monitor 1112 transfers the send request to the local service monitor 1114-3.

Based on the service name included in the send request, the local service monitor 1114-3 acquires the information relating to the service, prepares the service utilization information 1220-3 and sends it to the service monitor 1112 (1336-6). In this case, the local service monitor 1114-3 may selectively send a portion of the acquired service utilization information.

The service monitor 1112 sends the received service utilization information to the user command 1110. In this case, a portion of the service utilization information may be further selected and sent to the user command 1110.

The user command 1110 presents all or a portion of the received service utilization information to the user in the form of character information.

An operation of the local service monitors 1114-1, 1114-2 and 1114-3 is now explained.

The local service monitors 1114-1, 1114-2 and 1114-3 may acquire the service utilization information by reading files which store the service utilization information of the computers. The service utilization information includes information relating to the server names of the services utilized by the computers and the services thereof.

As described above, the send request from the service monitor to the local service monitor includes the computer name designated by the user. Based on the computer name, the local service monitor searches the file to acquire the desired service utilization information.

For example, in a system in which a NFS (Network File System) is implemented, the method described above may be used.

In the NFS, the work to mount on the remote file system is referred to as an NFS mount.

In many NFS's operating under the UNIX system OS, the mount record files 20030 and 20032 are /etc/mtab or /etc/mnttab. Those files include the file system which is the target of the NFS mount as well as entries of computers which mount the local file system. If the server name, which is the target of the NFS mount and which provides the NFS mount service, of the file entries matches to the computer name included in the information collection request from the service monitor 1112, the local service monitor sends the computer name of its own and the server directory name which is the subject of the NFS mount.

Besides the method described above for referring to the file, a method for referring to an output of a command or function for acquiring the service utilization information of the service which its own computer utilizes may be used. A service to acquire the service utilization information by this method includes an information retrieval service.

The information retrieval service is one of the network services for efficiently conducting the management of various information such as user information and host information on a computer network. In this service, in response to an inquiry from a client on the computer or the user information, the requested information is retrieved in the network and the desired information is sent to the client.

As an example of the information retrieval service, a NIS (Network Information Service) is explained. The NIS is implemented on some UNIX systems.

Most OS's which support the NIS are provided with a ypwhich command (HP 9000 Computer manual "HP-UX Reference Vol. 1 (Release 9.0)", ypwhich). By the ypwhich command, a character string indicating the computer name of the NIS server which the computer currently refers to is acquired. Accordingly, the local service monitors 1114-1, 1114-2 and 1114-3 may acquire the NIS service utilization information by using the ypwhich command.

When the NIS server computer name output from the ypwhich command matches the computer name included in the information collection request sent by the service monitor 1112, the local service monitor sends the above computer name and the computer name of its own computer to the service monitor. In addition to the information on the server which is currently referenced, the information on an alternate server which is referenced when the access to the server fails may also be acquired by using the function or command.

Figure 3:
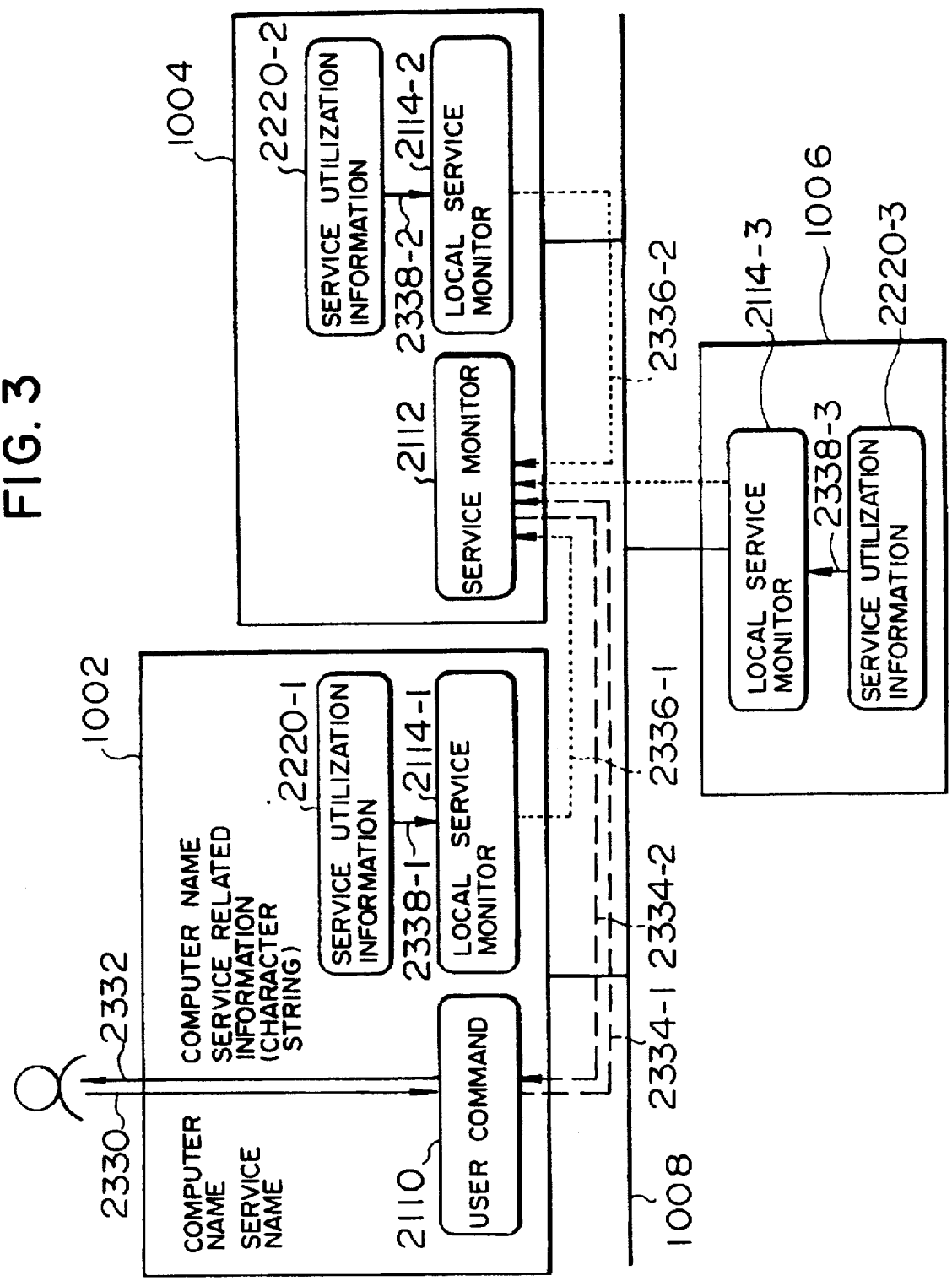
FIG. 3 shows a configuration of a collection apparatus for service utilization information by using a periodic check.

FIG. 3 shows the service information collection apparatus by the periodic check.

The computers 1002, 1004 and 1006 are connected through the communication line 1008. Local service monitors 2114-1, 2114-2 and 2114-3, are operated on the computers 1002, 1004 and 1006, respectively. A service monitor 2112 is operated on the computer 1004. The service monitors may be operated on a plurality of computers. Information (service utilization information) 2220-1, 2220-2 and 2220-3 on the services utilized by the respective computers, which are accessible from the local service monitors 2114-1, 2114-2 and 2114-3 are stored in the computers 1002, 1004 and 1006.

The user enters to the user command the service name which is the subject of monitoring. The input service name is transferred to the service monitor 2112 and also sent to the local service monitor. When the computer utilizes the service corresponding to the input service name, the local service monitor periodically collects the information on the server which provides that service 2338-1, 2338-2 and 2338-3. At the shut down of the service or a change of the service content, it sends a change between the previous information and the current information to the service monitor 2112 (2336-1, 2336-2 and 2336-3). In this case, all of the collected information may be sent to the service monitor 2112 at every predetermined number of times of transmission When the user desires the computer name which utilizes the services provided by the computer 1004 and the information on that service, the user enters to the user command 2110 the name of the computer 1004 and the service name 2330.

The user command 2110 presets that the service monitor 2112 operates on the computer 1004. The user command 2110 sends to the service monitor 2112 a request to collect information on the computer name which currently utilizes the service of the designated computer and the information on the service.

In response to the information collection request from the user command 2110, the service monitor 2112 logs the information periodically sent from the service monitors 2114-1, 2114-2 and 2114-3 and sends all or a portion thereof to the user command 2110. The user command 2110 outputs a portion or all of the collected information as a character string and presents it to the user 2332.

In the present system, the same method as that of the ordinary check may be used to acquire the service utilization information by the local service monitors 2114-1, 2114-2 and 2114-3 operating on the computers 1002, 1004 and 1006.

When the local service monitor refers to the service utilization information such as /etc/mtab or /etc/mnttab, whether or not the file has been updated is determined by using a stat system call (HP 9000 Computer manual HP-UX Reference Vol. 2 (Release 9.0), stat), and if it has been updated, the content of the file is read and only the change from the previous read may be sent to the service monitor 2112.

Another method for the local service monitors 2114-1, 2114-2 and 2114-3 operating on the computers 1002, 1004 and 1006 to acquire the service utilization information is to periodically execute a command or function to acquire the information on the service and utilize the execution result. In this case, each time the command or function is executed, the previous execution result is reserved and it is compared with the next execution result during the next execution.

For the NIS, for example, by using the ypwhich command as described above, the name of the computer of the NIS server to which its own computer currently refers may be acquired. When the computer name acquired by executing the ypwhich command is different from the execution result for the previous ypwhich command, the above computer name and its own computer are output as the result. In certain cases, not only the computer which is currently referred to as the server but also the server which is to be referred to when the computer which is currently referred to as the server is shut down, are tested by the function or command prepared as the library.

The computers 1002, 1004 and 1006 are connected through the communication line 1008. The service monitor 3112 operates on the computer 1004. In the illustrated example, only one service monitor is shown although computers may operate on a plurality of computers. Information (service utilization information) 3220-1, 3220-2 and 3220-3 on the services which the computers 1002, 1004 and 1006 utilize are stored on the computers.

In the present system, when the service configuration is to be changed, dedicated commands or functions (referred to as service modification commands) 3114-1, 3114-2 and 3114-3 are executed. By the execution of the service modification commands 3114-1, 3114-2 and 3114-3, the service utilization information 3220-1, 3220-2 and 3220-3 on the computers 1002, 1004 and 1006 are modified 3338-1, 3338-2, 3338-3. The modification of the service utilization information is informed to the service monitors 3336-1, 3336-2, 3336-3. The modification of the service utilization information means the start or stop of the service and the modification of the content of the service.

For example, when the user checks the name of the computer which utilizes the service provided by the computer 1006 and the information on the service, the user gives the computer name (the name of the computer which provides the service) and the service name to the user command 3110 (3330).

The fact that the service monitor 3112 operates on the computer 1004 is previously indicated to the user command 3110. The user command 3110 requests the service monitor 3112 which operates on the computer 1004 to collect the name of the designated computer and the information on the service 3334-1.

The service monitor 3112 sends a portion of or all of the information periodically sent from the service configuration modification commands 3114-1, 3114-2 and 3114-3 in accordance with the information collection request from the user command 3110.

The user command 3110 outputs a portion or all of the collected information as a character string and sends it to the user 3332.

One method to inform to the service monitor 3112 of the use of the service modification commands or functions 3114-1, 3114-2 and 3114-3 is to replace the service configuration command or function. Namely, a function to inform the modification of the service configuration is added to the conventional service configuration modification command or function.

For the NIS, for example, the function to inform the modification of the service configuration is added to a mount system call to mount a file system, an unmount system call to unmount the file system, a mount command to mount the file system, an unmount command to unmount the file system and an automount command to automatically mount and unmount the file system as required.

In order to acquire the name of other computers which utilize the service of its own computer within its own computer, a dedicated command or function is used or a file is read to collect the service utilization information and necessary parts are selectively output, although commands or functions to collect such information are not provided in all services.

As an example, the telnet is considered. When the user on the other computer logs in its own computer through the telnet, many OS's may use the netstat command to examine the name of the other computer. When the netstat command is executed, the status of the communication between its own computer and the other computer may be determined and the purpose of communication may be determined based on the resource depending on the service.

Figure 4:
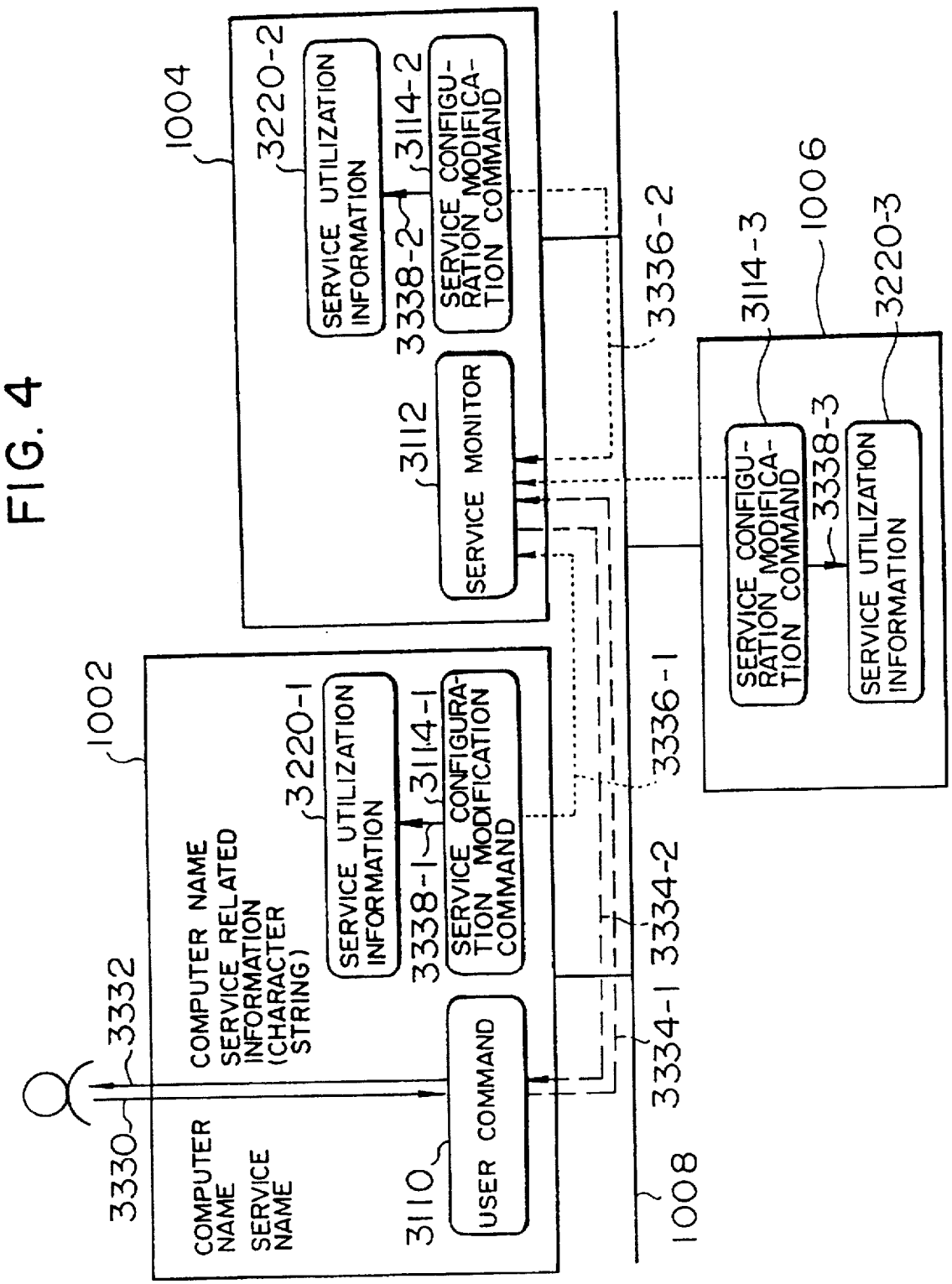
FIG. 4 shows a configuration of a collection apparatus for service utilization information by using an event driven check.

The service utilization information collection apparatus shown in FIGS. 2, 3 and 4 need not be independently implemented. Recently, personal computers (PC's) may be connected to a network to utilize a service of a workstation. For the PC's, since the programs such as the local service monitors 1114-1, 1114-2 and 1114-3 of FIG. 2 may not be executed in many cases, a method shown in FIG. 4 is used. Accordingly, a combination of a plurality of methods for collecting the service utilization information may be used such that for the workstation, the service utilization information is collected in the method of FIG. 2, and for the personal computer, the service utilization information is collected in the method of FIG. 4.

For the service in which the service utilization information is frequently modified, the method of FIG. 2 may be used, and for the service in which the service utilization information is rarely modified, the method of FIG. 3 or FIG. 4 may be used.

The content of the process in collecting the service utilization information is now explained in detail.

Figure 5:
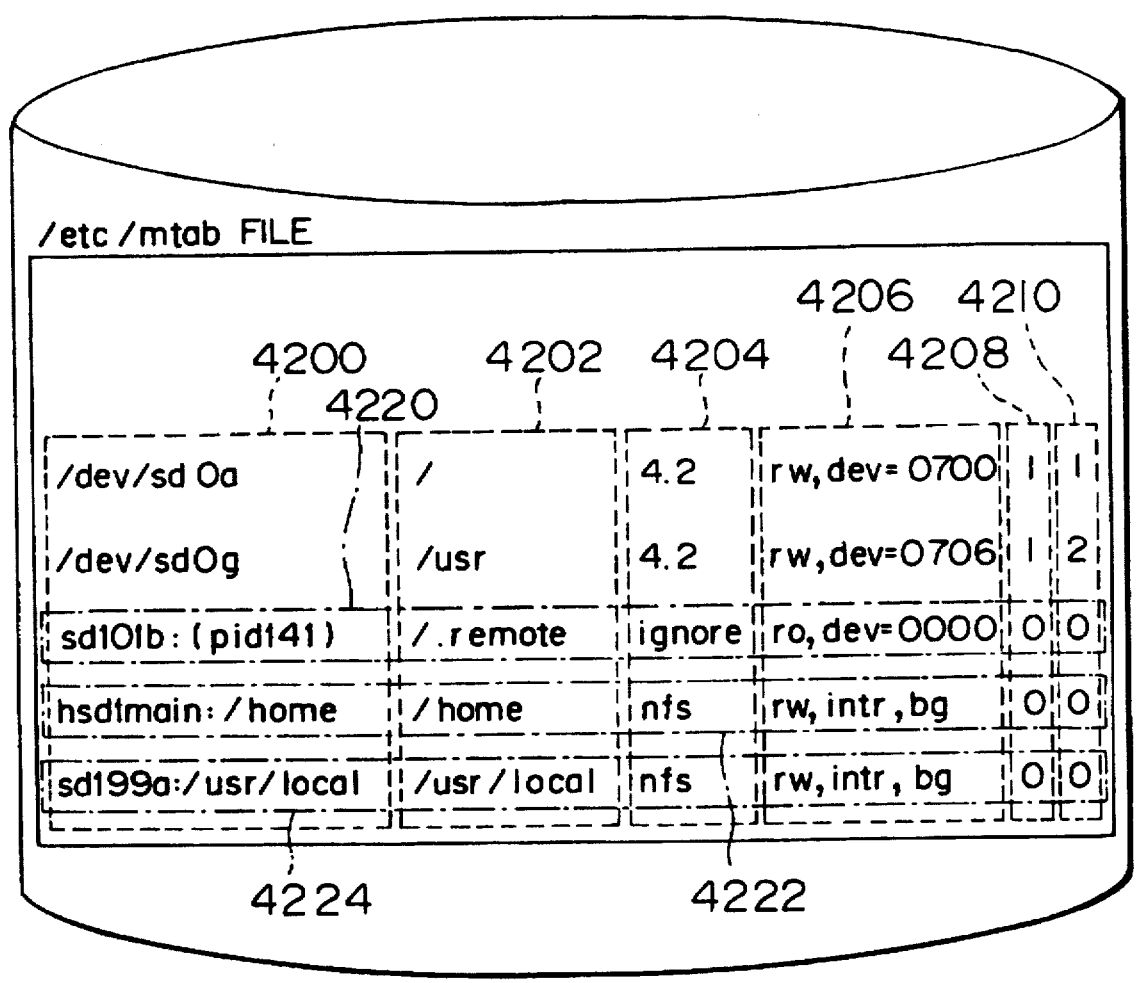
FIG. 5 shows a file.

FIG. 5 shows an example of a /etc/mtab file. In this file, one line corresponds to one entry and there are five entries in the example shown in FIG. 5. One entry comprises six fields 4200, 4202, 4204, 4206, 4208 and 4210.

The first field 4200 represents a file system name which a client mounts. In the file system name which includes:, a portion on the left side of: represents an NFS server computer name and the right side represents a mount directory on the computer. When an entry (for example, 4220) includes a character string in parentheses "( )" such as "(pid141)" following ";", it represents an entry which is not for a file system which is actually mounted but an entry which is used when the automount to automatically mount as required is executed, and it is not significant in the present example.

The second field describes a location of the mount on its own computer, of the file system designated by the first field, by using an absolute path name on its own computer.

The third field 4204 represents a type of the file system to be mounted. "4.2" represents a UNIX file system directly connected to its own computer and "NFS" represents an NFS file system.

The fourth field 4206 represents an option for mounting and describes whether the mounting is permitted for reading and writing and whether a retry when the mount fails is to be conducted or not.

The fifth field 4208 is used when the file system is to be backed up and designates an interval of back-up by the number of days. The sixth field 4210 describes a sequence to check the file system at the start-up.

In order to locate the entry on which a specific computer file system is NFS mounted from the /etc/mtab file, an entry which concurrently meets the following two conditions may be searched.

(a) The first field 4200 describes an NFS file system on the NFS server.

(b) The third field 4204 describes the NFS.

Figure 6:
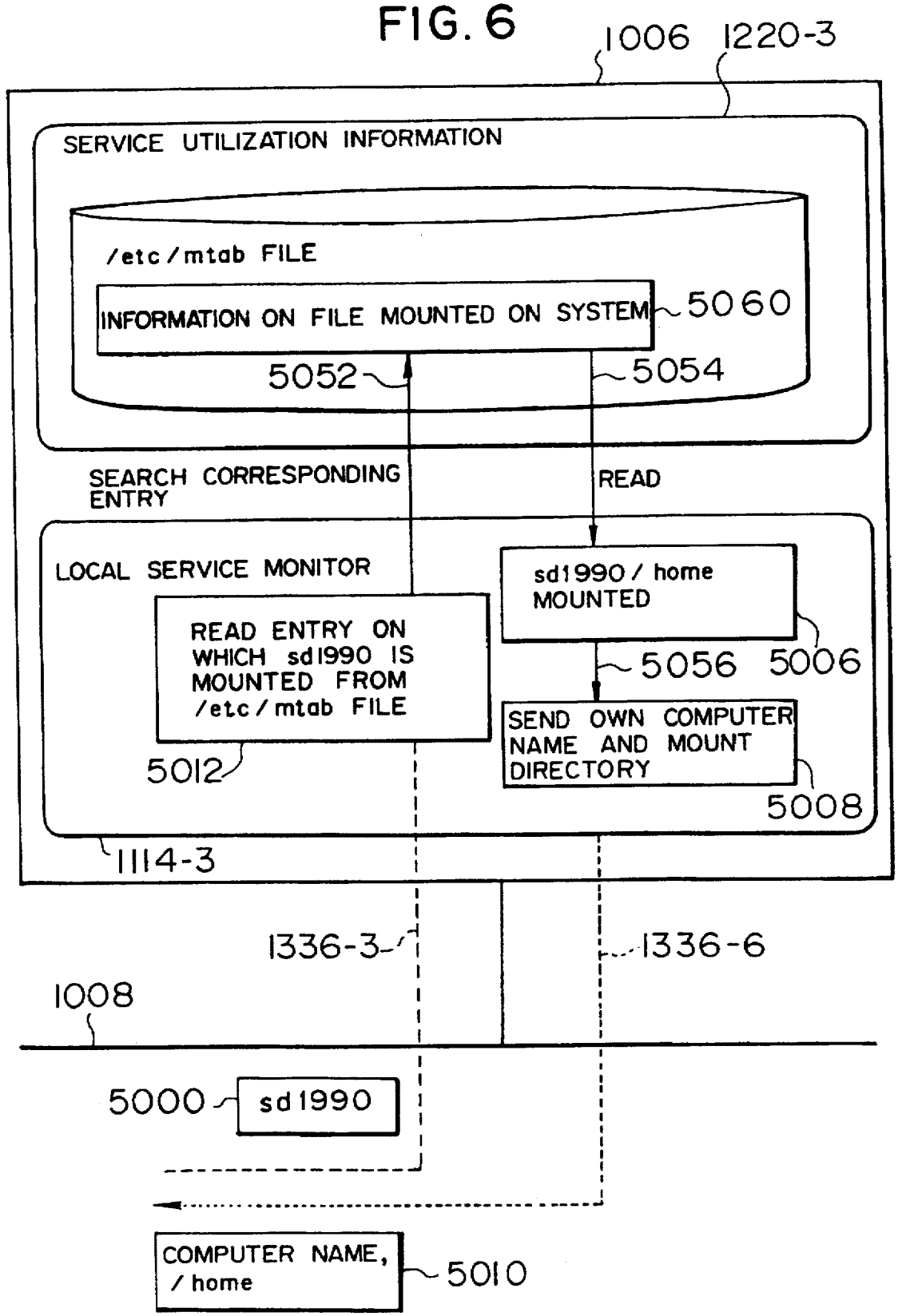
FIG. 6 shows collection of the NFS service utilization information by using the ordinary check.

FIG. 6 shows a process to search the entry on which the specific computer is NFS mounted from the /etc/mtab on the computer 1006 of FIG. 2.

The local service monitor 1114-3 receives the computer name 5000 sent with the service utilization information collection request from the service monitor 1112 of FIG. 2 1336-3. It searches the entry on which the computer having the computer name 5000 is mounted from the /etc/mtab file 5060 in the service utilization information 1220-3 (5052) and reads it 5054. It reads the directories of other computers mounted thereon from the read information 5056 and sends a result 5010 to the requesting service monitor 1112 of FIG. 2 1336-6 together with the name of its own computer 5008.

Figure 7:
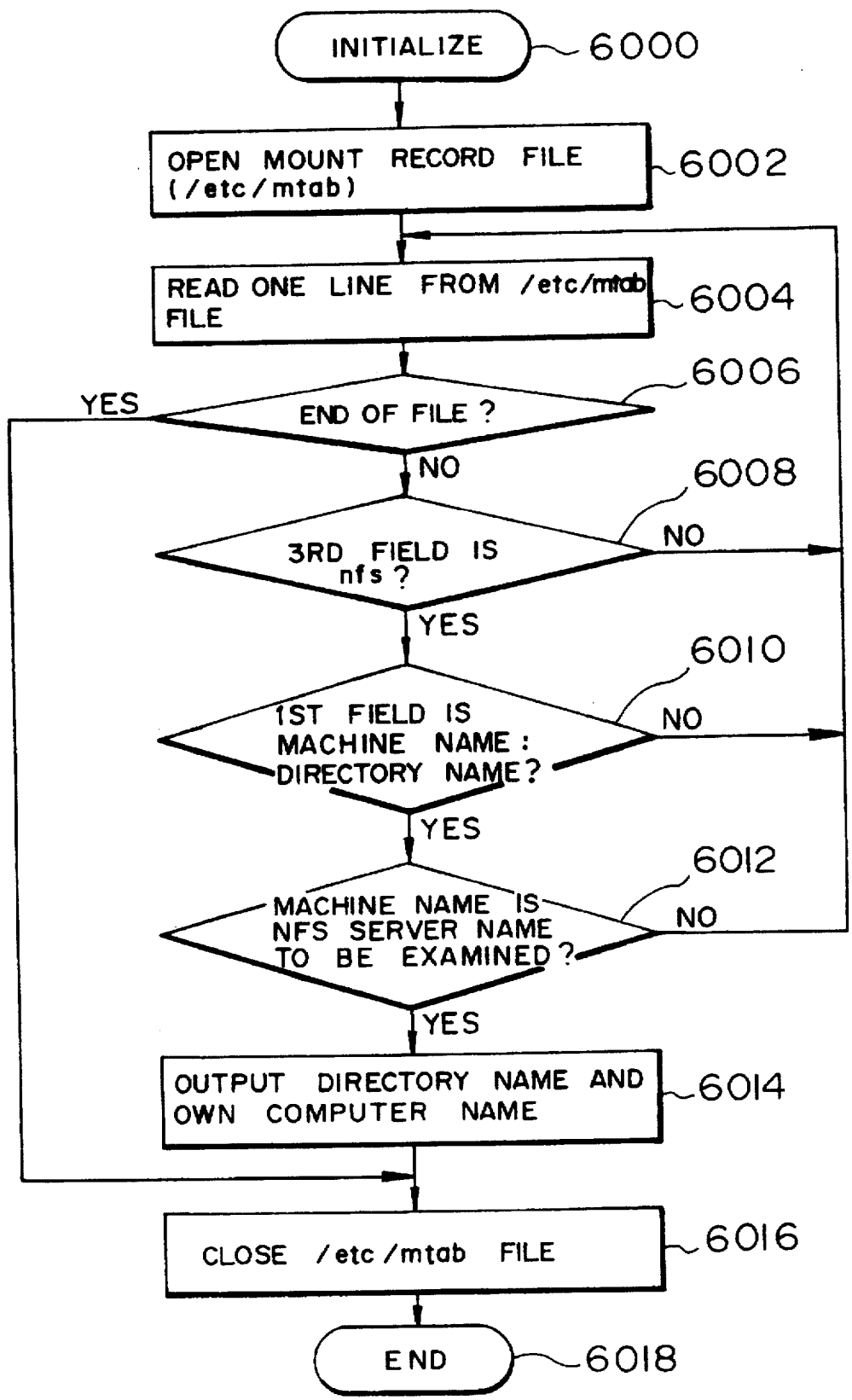
FIG. 7 shows a flow chart for collecting the NFS service utilization information by using the ordinary check.

FIG. 7 shows a flow of the above process.

After initialization 6000, a mount record file (for example, /etc/mtab) is opened 6002 and one line is read from the file 6002. Whether it is an end of the file or not is determined 6006, and if it is, the /etc/mtab is closed 6016 and the process is terminated 6018.

If data still remains in the file, the above conditions are checked. Namely, the directory name of the entry which meets the conditions that the NFS is described in the third field 6008, the computer name and the directory name with the punctuation by ":" are described in the first field 6010 and the name of the NFS server which is to be examined as the computer name is described 6012, is retrieved and it is output together with its own computer name 6014. If any one of the above conditions is not met, the reading of one line from the file 6004 is repeated.

In the example of FIG. 5, two lower entries 4222 and 4224 of the five entries are the NFS mount entries. By checking if the SD199A file system is mounted or not, it is seen that the lowest entry 4224 mounts /usr/local/src of the SD199A file system.

Besides the method for directly reading the above file, a library for referring to the above file is provided in some OS's.

Besides the NFS, the service which holds a file describing the service utilization information on each computer may be examined in the same manner. For example, when one computer is a printer server, the name of the computer which uses that one computer as the server may be examined in many UNIX OS's by examining an RM entry of a file /etc/printcap on which a printer setting is described.

The NIS is now explained. In order to examine the NIS server whose NIS services its own computer utilizes, a dedicated command to examine the currently utilized NIS server may be executed. For this command, the ypwhich command is provided in many OS's.

When the ypwhich command is executed, the server name which is currently referred to if the NIS service is utilized is output. If the NIF service is not utilized, an error message such as 'ypwhich:sd1990 is not running ypbind' is issued. Accordingly, the execution result of ypwhich may be compared with the NIS server name to be examined.

In order to check whether the NIS service is utilized or not, besides the execution of the above command, a function dedicated to the NIS may be used.

Figure 8:
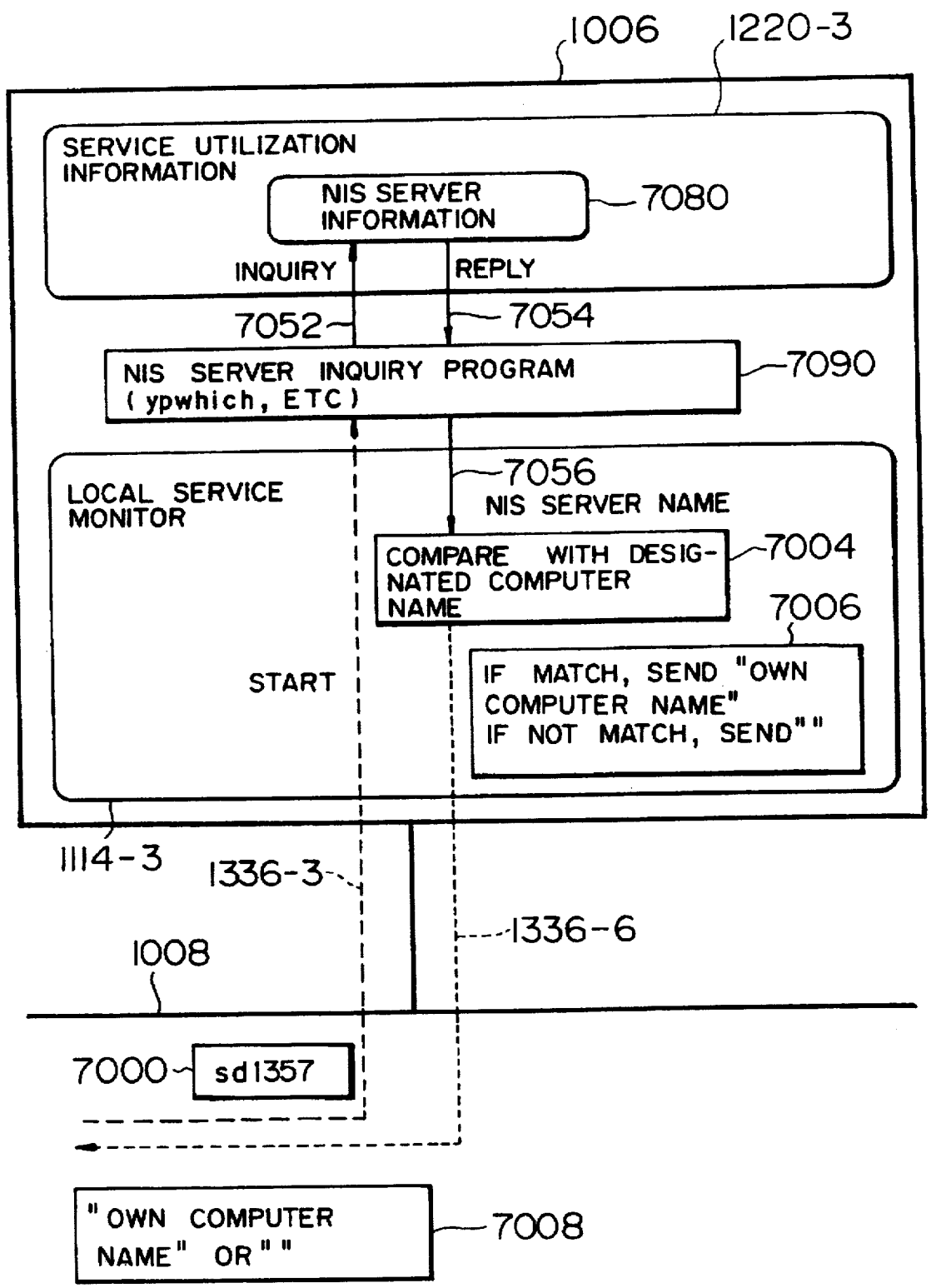
FIG. 8 shows collection of the NIS service utilization information by using the ordinary check.

FIG. 8 shows a manner to determine whether the computer 1006 of FIG. 2 refers to a specific computer as the NIS server or not.

When the computer name 7000 is sent from the service monitor 1112 of FIG. 2, the local service monitor 1114-3 starts a NIS server inquiry program 7090, which reads the server name form the NIS server information 7080 stored in the service utilization information 1220-3 (7052, 70554) and outputs the result 7056. When the local service monitor 1114-3 receives the result, it compares the result with the initially received computer name 7000 (7004) and if they match, it sends its own computer name, and if they do not match, it sends a blank character string as the result 7006 to the service monitor 1112 of FIG. 2 which sent the request.

Figure 9:
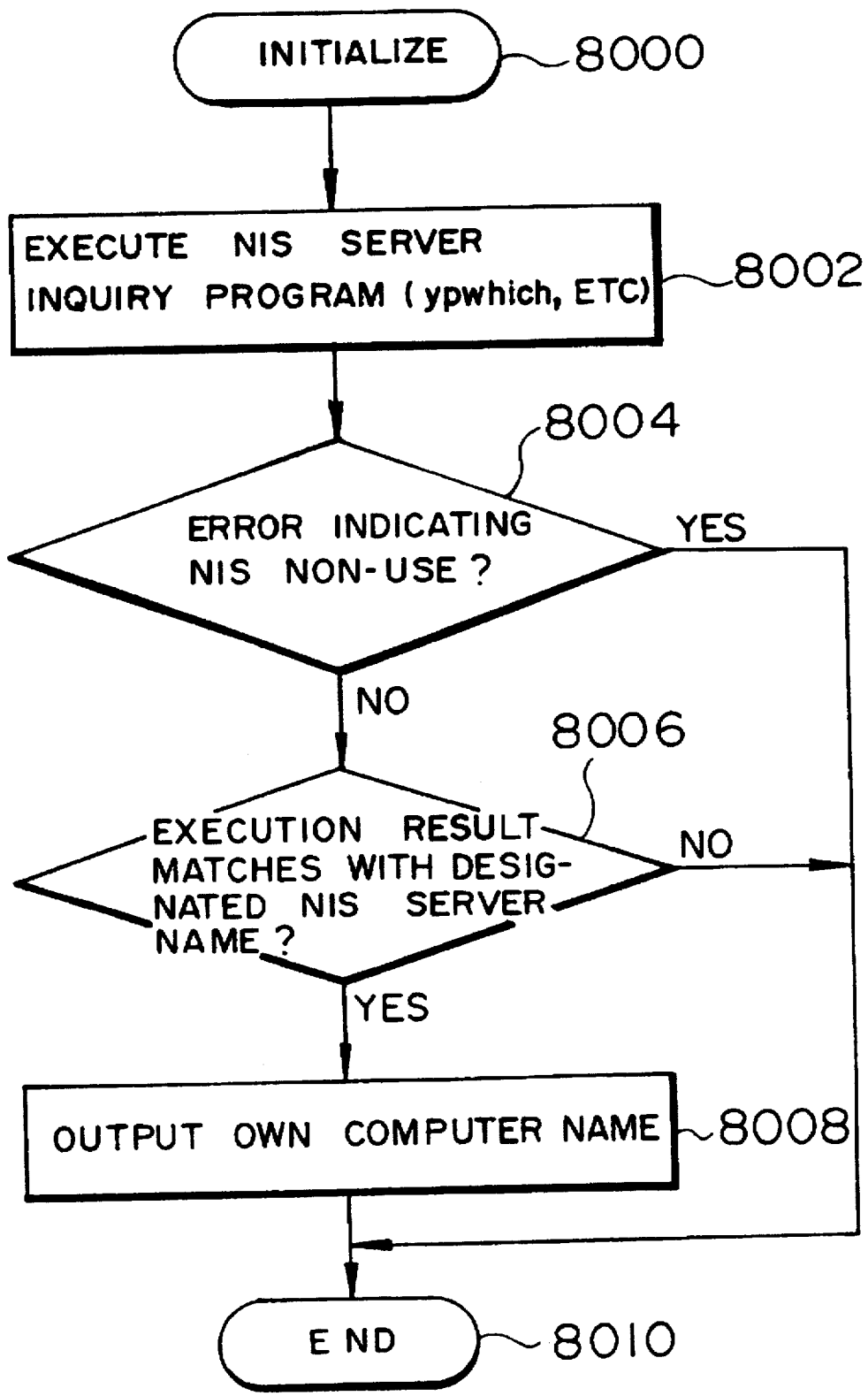
FIG. 9 shows a flow chart for collecting the NIS service utilization information by using the ordinary check.

FIG. 9 shows a flow of the above process.

In order to acquire the NIS service utilization information, the ypwhich command is executed 8002 after the initialization 8000. If an error occurs 8004 by the execution of the command, the process is terminated. If the execution result of ypwhich is not an error but a computer name, it is compared with the given NIS server name 8006 and if they match, the name of its own computer is output 8008.

The NIS domain name and the range of control by the NIS may also be output as the information to the NIS service. When a plurality of NIS relating domains are included, information as to which domain is referred to may be required.

In the service which the computer provides, there are many commands which use a socket as a communication interface such as the telnet which provides a remote terminal function and the ftp which transfers a file between computers. In order to communicate by the socket, the communication is performed by using a resource called a port in each computer.

In the client-server system, when a client is connected to a server, normal connection is not made and communication is not performed unless a port on the server to which the client is to be connected is the port to which the server is waiting for the connection. Accordingly, the client must be aware of the port to which the server is waiting for the connection. To this end, in some services, a port is allocated to a particular service. The server waits for the connection while it uses that port and the client connects to that port. This port is referred to as a well-known port which is the port 23 for the telnet and the port 21 for the ftp.

Accordingly, if the port number used for the communication between two computers is known, the port number on the server is examined and if it is the well-known port, the service utilized through the communication path is known. For the client program of the X-Window System, since the server uses a specific port number 6000, it is known by checking the port number of the server. In the X-Window System, since the window is displayed on the server and the client executes the program which displays the window, it is necessary to check whether the port number of other computer is 6000 or not in order to determine whether the client program of the X-Window System is executed on its own computer or not.

Some OS's are provided with means for checking the information on the communication between its own computers and other computer such as the computer name and the port number. For example, some OS's are provided with the netstat command, and when it is executed with a '-f inet' option, the necessary information may be retrieved.

Figure 10:
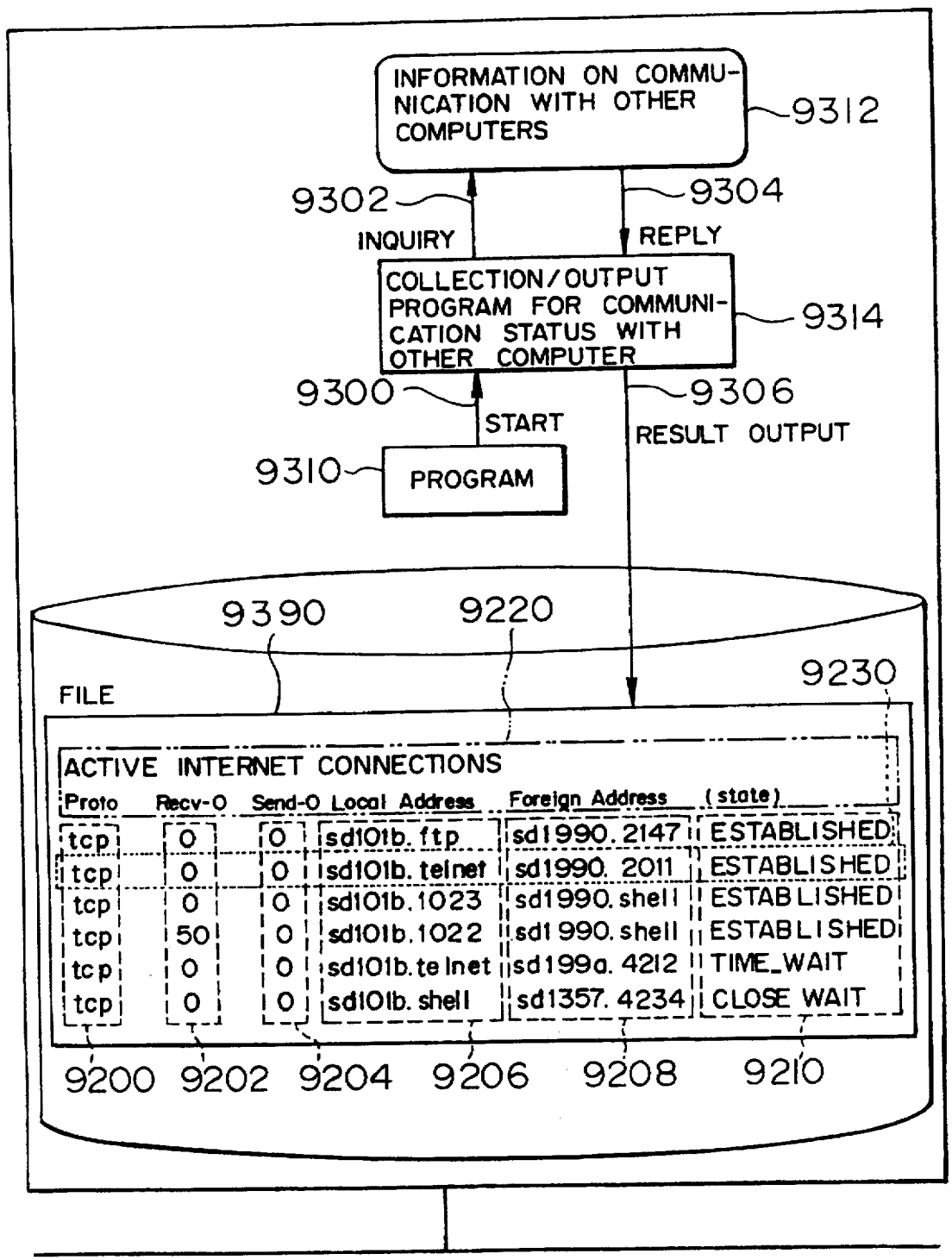
FIG. 10 illustrates execution of a netstat command.

FIG. 10 shows an example of execution of the netstat command. A result 9390 is derived by starting 9300 the netstat 9314 which is the program for collecting and outputting the communication status with other computers by a program 9310 and outputting it 9306. The netstat 9314 inquires the information on the communication with the other computer to the system 9302 and reads it 9304.

A result 9390 is derived by executing the netstat command with '-f inet' option. The option does not display the information on the communication in its own computer but displays only the information on the communication through the network.

In an example of output of the netstat command of FIG. 10, first two lines 9220 are for labels and the following one line is for an entry. Each line comprises six fields 9200, 9202, 9204, 9206, 9208 and 9210.

The first field 9200 describes a protocol to be used. The second field 9202 describes a size of a receive queue and the third field 9204 describes a size of a send queue. The fourth field 9206 describes an address of its own computer on the communication path and the fifth field 9208 describes an address of the other computer.

The fourth field 9206 and the fifth field 9208 are represented with the host name or the IP address and the port name or the port number being connected by ":". For example, in the fourth line 9230 from the top of FIG. 10, the host name of its own computer is SD101B, the port name is telnet, the host name of the other computer is SD1990 and the port number is 2011.

The association of the port name with the port number and the association of the host name with the host address are conducted by looking up a table by the netstat command to convert only convertible ones to the host name and the port name. In many OS's, the table of the port name and the port number is stored in /etc/services and the table of the host name and the host address is stored in /etc/hosts.

The sixth field 9210 describes the status of the communication path. For example, established represents a valid connection, close wait represents waiting for the closure of the socket and time wait represents waiting for the shut down of the socket by the other computer after the closure of the socket.

When the netstat command is executed, the conversion from the port name to the port number and the conversion from the host name to the IP address are conducted for each line. Thus, when many entries are involved, a considerable amount of time may be required for the conversion. To conduct the process rapidly, they are outputt without conversion and only necessary portions are converted after the result has been examined. For example, in the netstat command on many OS's, '-n' option is provided to suppress the conversion.

Figure 11:
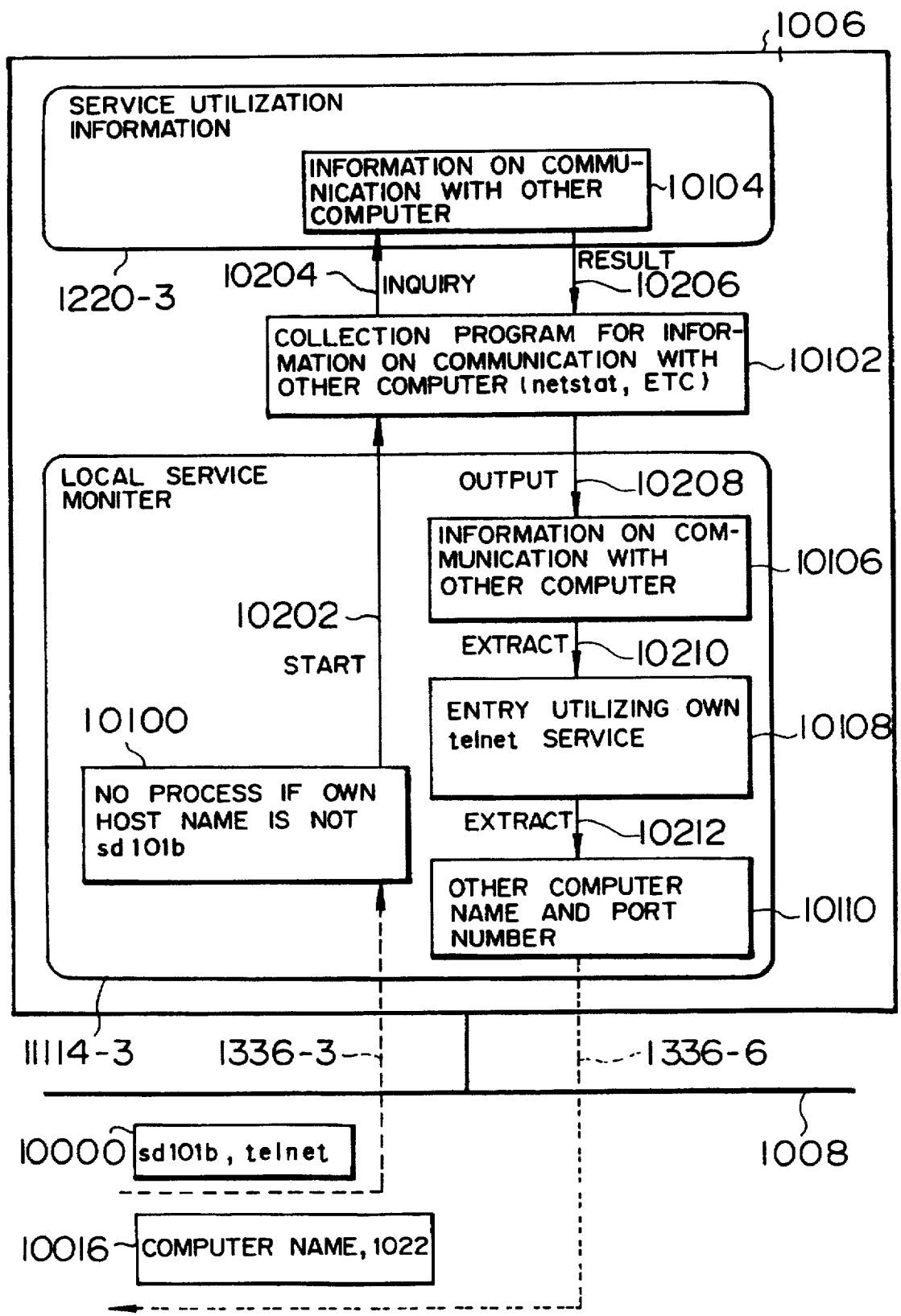
FIG. 11 shows a collection of TELNET service utilization information.

FIG. 11 shows a means to determine, on the computer 1006 of FIG. 2, a name of the computer on which a user who utilizes the telnet service of its own computer is present.

The local service monitor 1114-3 on the computer 1006 receives the computer name and the service name 10000 from the service computer 1112 of FIG. 2 1336-3. If the computer name matches the name of its own computer, the following process is conducted, and if it does not match, no process is conducted 10110.

The netstat command of the program for collecting the information on the communication with other computer 10102 is then executed to acquire the information 10104 on the communication in the service utilization information 1220-3 (10204, 10206).

The entry 10108 which utilizes the telnet service provided by its own computer is then extracted 10210 from the information 10106 outputt 10208 by the netstat and the name of the other computer and the port number 10110 are extracted therefrom 10212. They are sent to the service monitor 1112 of FIG. 2 as the collective result.

Figure 12:
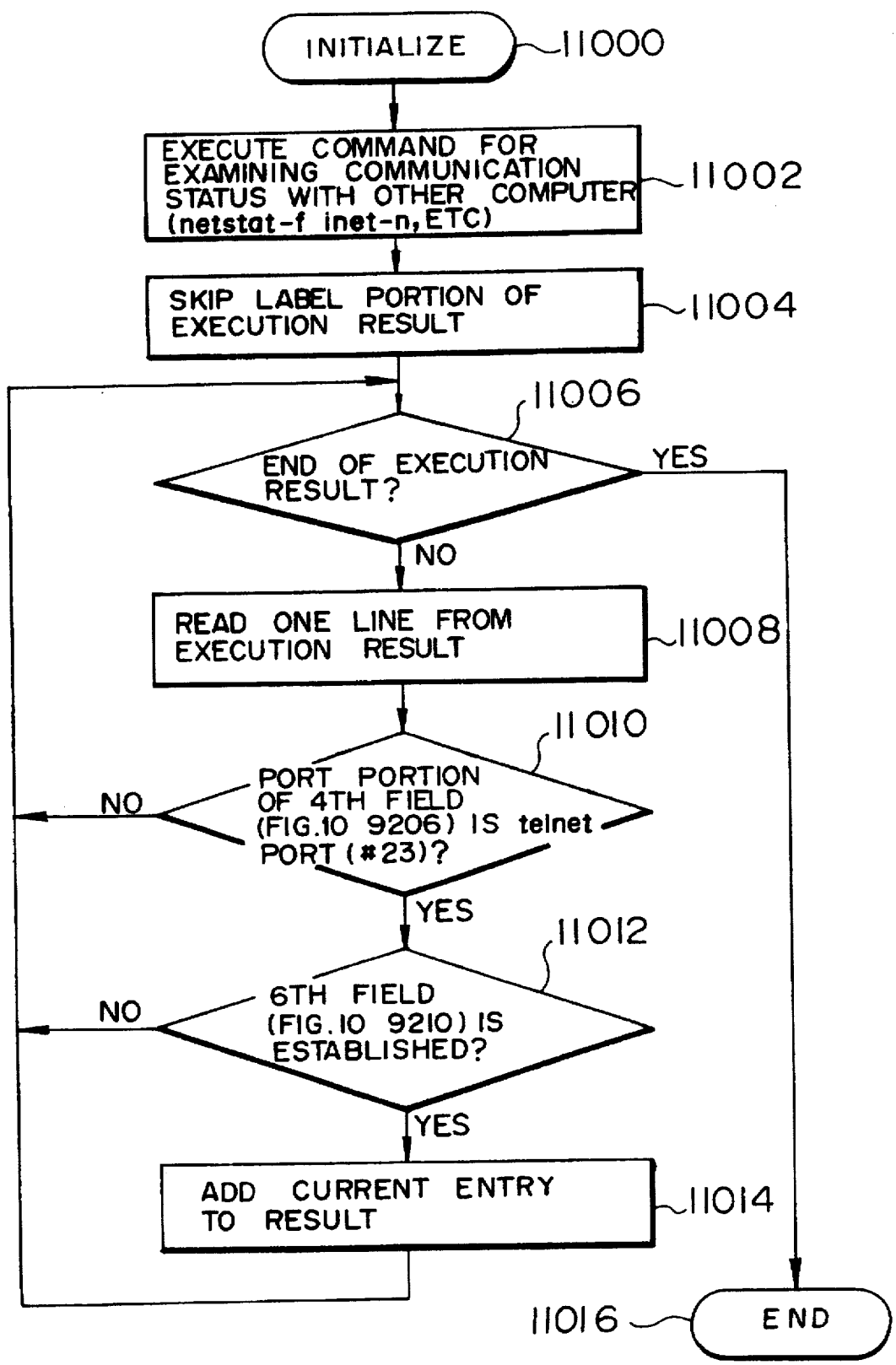
FIG. 12 shows a flow chart for collecting the TELNET service utilization information.

FIG. 12 shows a flow of the above process.

After the initialization 11000, the netstat command with the '-f int -n' option is executed 11002. From the execution result, a unnecessary label corresponding to 9220 of FIG. 10 is skipped 11004. For each line of the remaining data, the fifth field corresponding to 9208 of FIG. 10 of the line which meets the following conditions is sequentially added to the result 11014.

The port number of the fourth field corresponding to 9206 of FIG. 10 is the port number of the telnet 11010.

The sixth field corresponding to 9210 of FIG. 10 is established 11012.

A flow of the process of the service utilization information collection apparatus shown in FIGS. 2, 3 and 4 is now explained.

Figure 13:
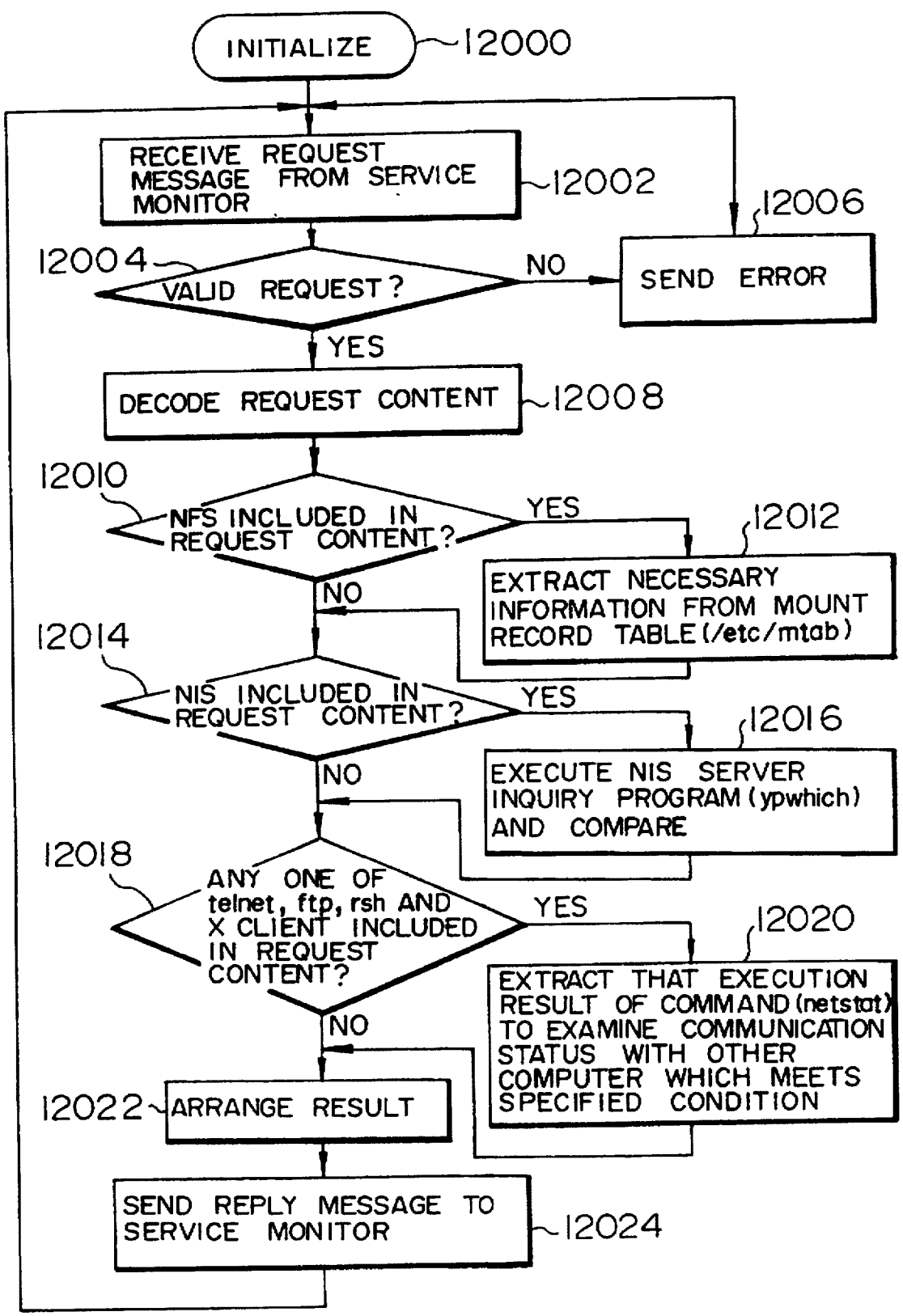
FIG. 13 shows a local service monitor flow chart in the collection apparatus for the service utilization information by using the ordinary check.

FIG. 13 shows a flow of the process of the local service monitors 1114-1, 1114-2 and 1114-3 in the service utilization information collection apparatus of the ordinary check of FIG. 2. First, an initialization unit 12000 initializes variables and secures a memory. A request message receiving unit 12002 waits for the arrival of a request message from the service monitor 1112.

When the request message arrives, whether or not the content of the message is a valid request from the service monitor 1112 is determined 12004 because it is not known whether the message is from the service monitor, from a user or is an invalid message. When the message is not a valid request, an error message is sent to the service monitor 1112 (12006).

If the received request message is a valid request, the content thereof is decoded 12008 to determine whether or not the content of the request relates to the NFS service 12010. If it is, it extracts necessary information from a mount record table (/etc/mtab or /etc/mnttab) 12012. This process 12012 corresponds to the process of FIG. 7 and more particularly, it searches from the /etc/mtab (or the /etc/mnttab) the entry which meets the conditions of The first field describes the NFS file system The third field is "NFS".

to extract the name of the server on which it is mounted.

In the same manner, if it is directly a request for the NIS service 12014, the ypwhich command is executed in the above manner and it is compared with the computer name included in the message together with the request 12016. The process 12016 corresponds to the process of FIG. 9.

Whether or not a request for the client of the telnet, ftp, rsh and X-Window System is included in the request is determined 12018, and if it is included, the netstat command is executed to examine the communication status with other computer and an entry which meets a specific condition is extracted based on the execution request 12020.

If the process 12020 is a request to determine which computer utilizes the telnet service of the above computer, it corresponds to the process of FIG. 12. Namely, from the execution result of the netstat command, an entry which meets the conditions of The port number in the fourth field is the port number of the telnet.

The sixth field is established Execution result.

is extracted and the information necessary for the both port numbers are extracted from the entry 12020.

The above result is arranged 12022 and it is sent to the service monitor which sent the request message, as a reply message 12024. After the message has been sent, it repeats the process from the reception of the request message from the service monitor by the receive unit 12002.

Figure 14:
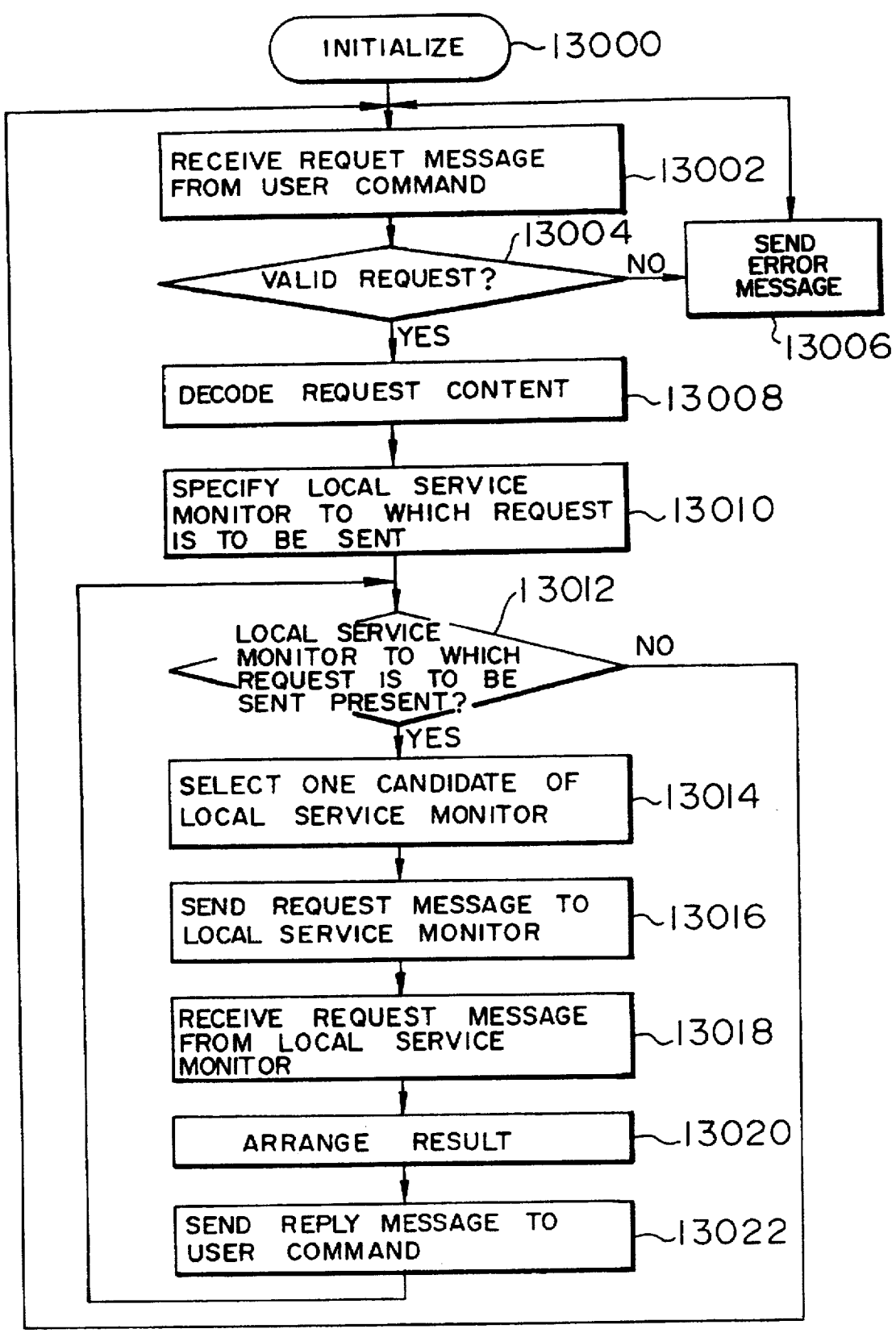
FIG. 14 shows a service monitor flow chart in the collection apparatus for the service utilization information by using the ordinary check.

FIG. 14 shows a flow of the process of the service monitor 1112 in the service utilization information collection apparatus of the ordinary check of FIG. 2. An initialization unit 13000 first initializes variables. Then, a request message from a user command 1110 is monitored 13002.

When the request message arrives, whether or not the content thereof is a valid request from the user command 1110 is determined 13004. If it is not a valid request, an error message is sent to the user command 1110 (13006).

If the received request message is a valid request, the content thereof is decoded 13008 to determine a type of service for which the information is to be collected and a local service monitor to which the request is to be sent 13010. In there is a local service monitor to which the request is to be sent 13012, the request message is sent 13016 to the local service monitor 13014.

The local service monitor process in accordance with the request message as explained in connection with FIG. 13 and it sends a reply message 12024 of FIG. 13. The service monitor receives the reply message 13018. Then, it arranges the result 13020 and sends the reply message to the user command 1110 (13022).

Thereafter, it repeats the process from the step 13012 for the candidates of the next local service monitor to which the request is to be sent. When the local service monitor to which the request is to be sent is no longer present, it again waits for a message from the user command 13002.

Figure 15:
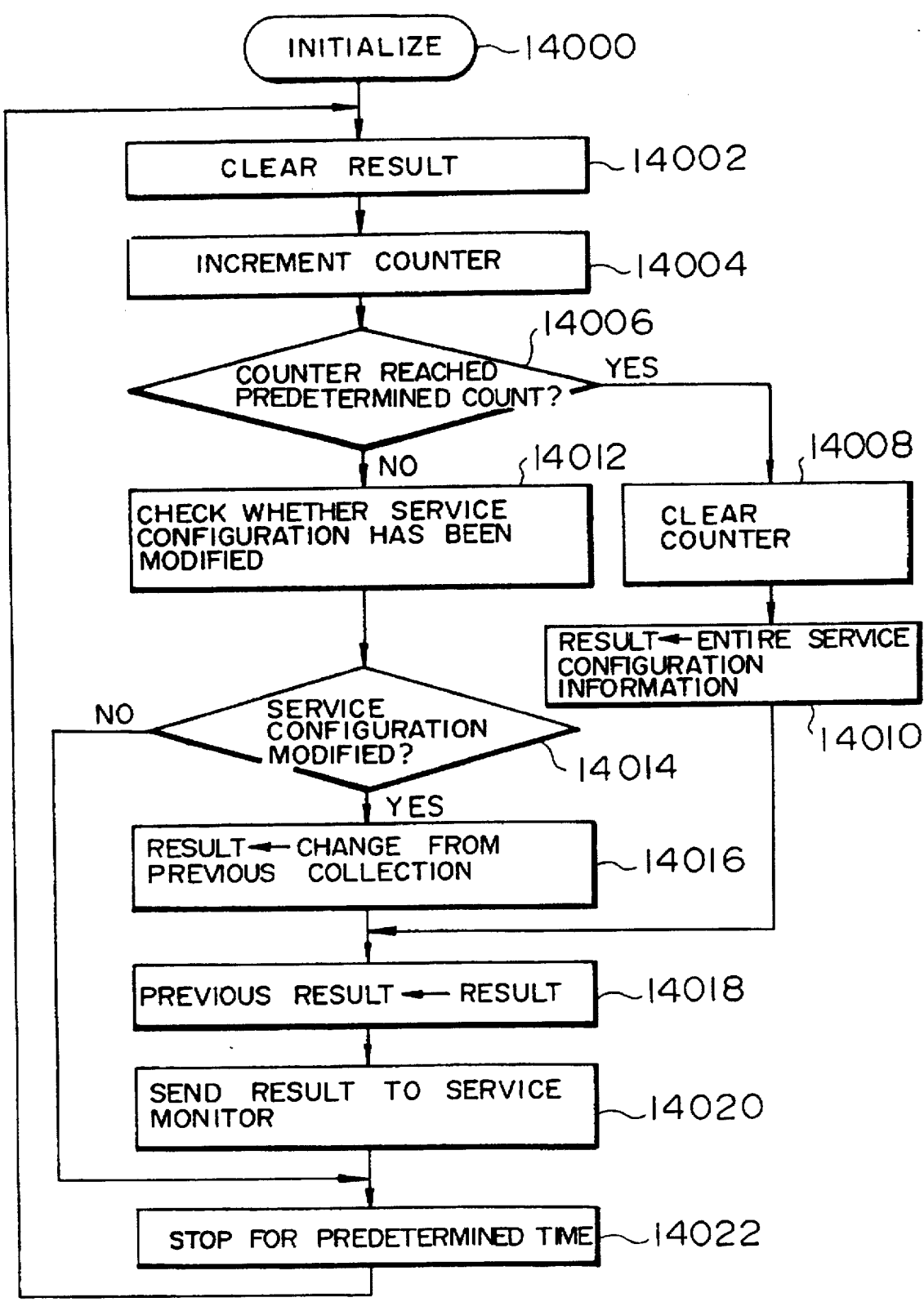
FIG. 15 shows a local service monitor flow chart in the collection apparatus for the service utilization information by using the periodic check.

FIG. 15 shows a flow of the process of the local service monitors 2114-1, 2114-2 and 2114-3 in the service utilization information collection apparatus of the periodic check of FIG. 3.

Variables are first initialized 14000. A result to be sent to the service monitor is cleared 14002 and a counter is incremented 14004. The counter is used to send the entire service configuration information at every several times and it is cleared to zero at the initialization. The result means a memory area to store the information to be sent to the service monitor and the information stored in the memory area may also be referred to as the result. A previous result to be described later refers to a memory area to store previous result information and the information stored in the memory area.

Whether or not the counter has reached a predetermined count is determined 14006 and if it has the counter is cleared 14008 and the entire service configuration information is used as the result to be sent to the service monitor 14010.

If the count has not yet reached the predetermined count 14006, whether or not the service configuration has been modified is determined 14012, and if it has been modified 14014, it is compared with the previous result and a difference therebetween is created as the result 14016. The result when the counter reaches the predetermined count or the result when the service configuration has been modified is reserved as the previous result 14018 and it is reported to the service monitor 14020. If the service configuration has not been modified 14014, the service monitor sends nothing.

After the processing of the result, the process stops for a predetermined period 14022 and then resumes the process from the result clearing step 14002. The duration of the stop for or the predetermined period is short if the service configuration is frequently modified and long if it is rarely modified.

Figure 16:
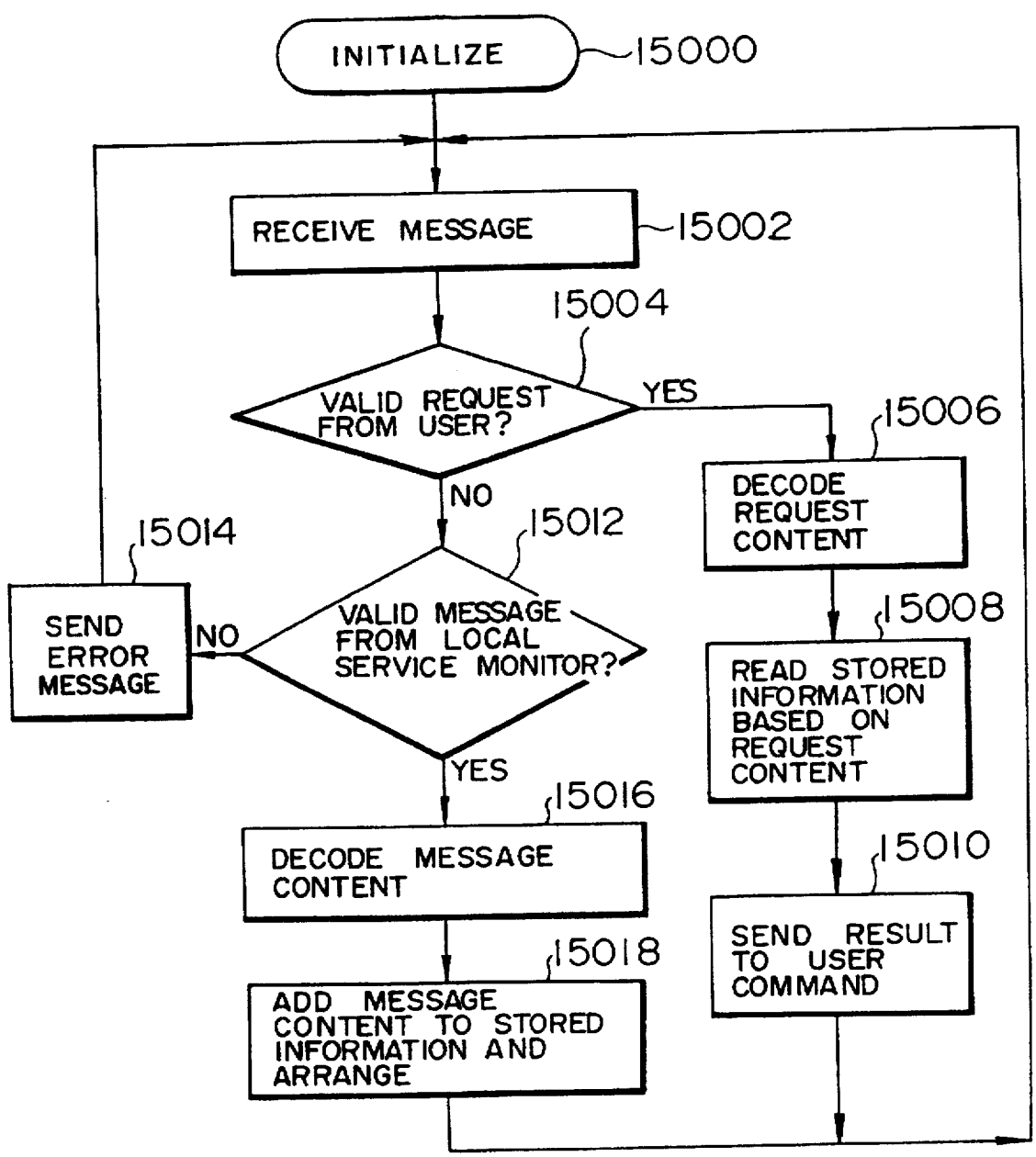
FIG. 16 shows service monitor flow chart in the collection apparatus for the service utilization information by using the periodic check.

FIG. 16 shows a flow of the process of the service monitor 2112 in the service utilization information collection apparatus of the periodic check of FIG. 3. An initialization unit 15000 initializes variables, and a message from a user command or a local service monitor is monitored 15002.

Whether or not the received message is a request from the user command is determined 15004, and if it is a request from the user command, the content of the request is decoded 15006 and the stored information is extracted in accordance with the content 15008 and it is sent to the user command 15010. Then, the process from the message reception step 15002 is repeated.

If the message is not the request from the user, whether or not it is a message from the local service monitor is determined 15012 and if it is not, an error message is sent to the sender of the message 15014. If it is a valid message from the local service monitor, the content of the message is decoded 15016 and it is added to the stored information or the unnecessary portion is deleted and the result is arranged 15018. Thereafter, the process from the message reception step 15002 is repeated.

Figure 17:
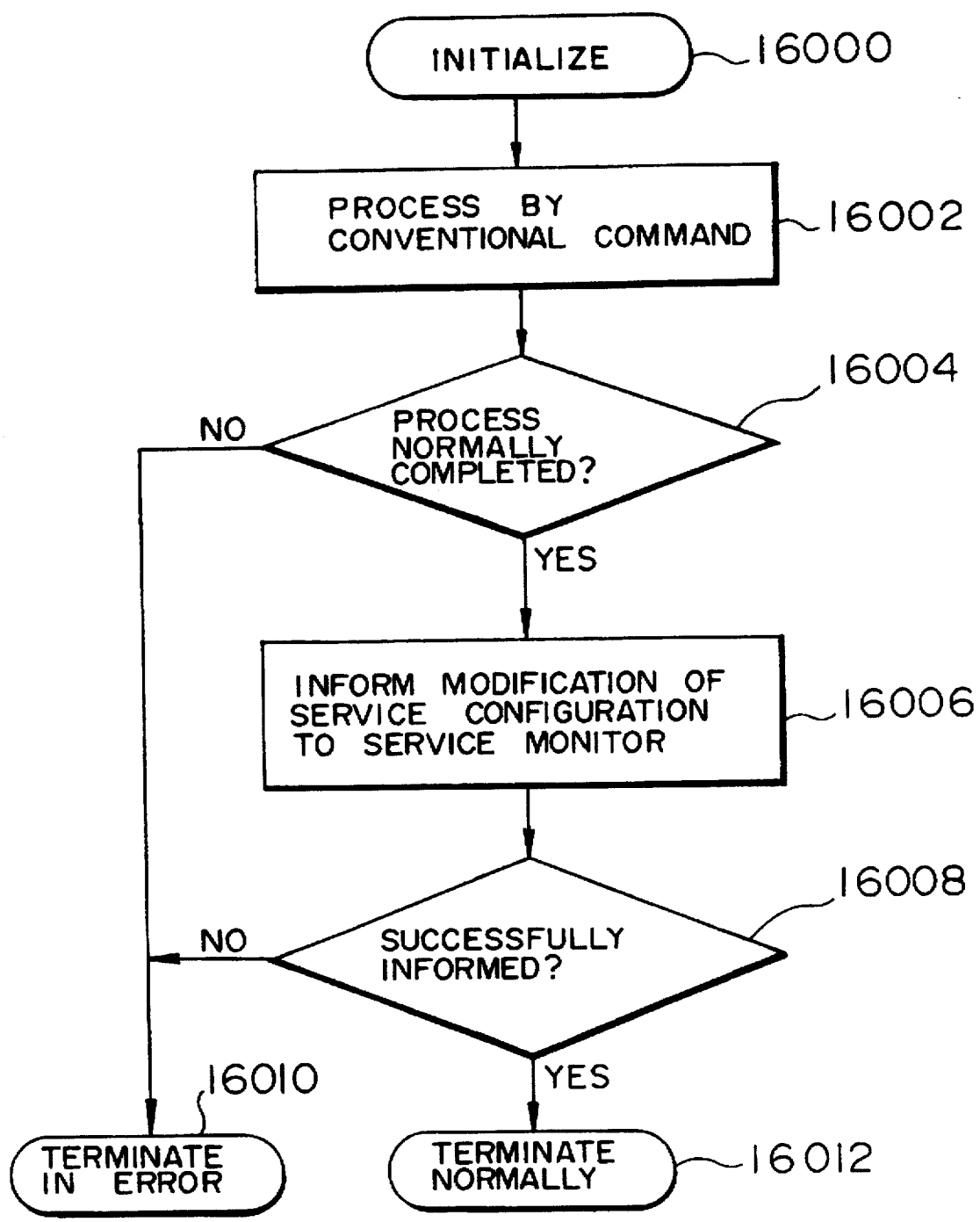
FIG. 17 shows a flow of process of a service reconfiguration command in the collection apparatus for the service utilization information by using the event driven check.

FIG. 17 shows a flow of the process of the service configuration modification command in the service utilization information collection apparatus of the event driven check of FIG. 4. An initialization unit 16000 first initializes variables, and the process which has been conducted the original command before the replacement is conducted 16002 to determine whether or not the process has been normally completed 16004.

If the process has been normally completed, the modification of the service configuration is informed to the service monitor 16006. When the information to the service monitor is completed normally 16008, the process is normally terminated 16012.

When an abnormal state occurs in the process 16002 or 16006, an error message is issued and the process is terminated in error 16010. In some cases, when the report to the service monitor fails, retransmission by a predetermined number of times may be required or the resetting of the modification of the service configuration may be required.

A method for controlling the shut down of the computer system by using the service utilization information collection apparatus is now explained. Before the explanation of the control of the shut down of the computer system, a dependency relation which is an important concept to be considered in controlling the shut down and a dependency relation loop are explained.

Figure 18:
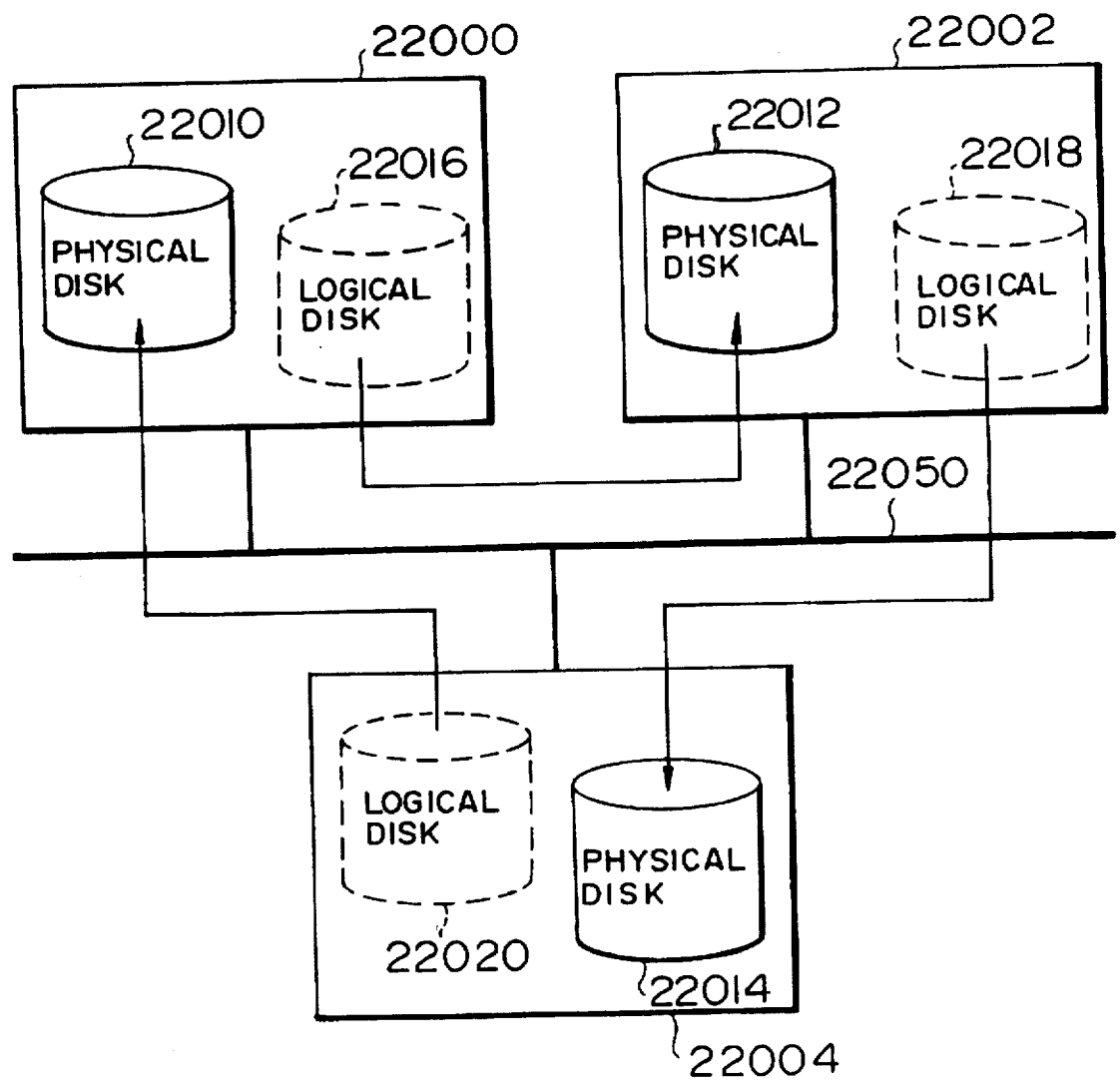
FIG. 18 shows a dependency relation loop.

FIG. 18 shows a chart for illustrating the dependency relation and the dependency relation loop. Computers 22000, 22002 and 22004 are connected through a communication line 22050. The computer 22000 directly connects a physical disk 22010, the computer 22002 directly connects a physical disk 22012 and the computer 22004 directly connects a physical disk 22014 to themselves, respectively.

The computer 22000 mounts the physical disk 22012 connected to the computer 22002 on its own computer as a remote disk and refers to it as a logical disk 22016. Similarly, the computer 22002 refers the physical disk 22014 of the computer 22004 as a logical disk 22018 and the computer 22004 refers to the physical disk 22010 of the computer 22000 as a logical disk 22020.

The manner of referring to the physical disk 22012 of the computer 22002 as the logical disk 22016 by the computer 22000 is that the computer 22000 depends on the computer 22002 or is in the dependency relation. Similarly, the computer 22002 depends on the computer 22004, and the computer 22004 depends on the computer 22000.

Where the dependency relation is cyclic such that the computer 22000 depends on the computer 22002, the computer 22002 depends on the computer 22004 and the computer 22004 depends on the computer 22000 as shown in FIG. 18, the relationship is characterized the dependency relationship being in loop.

A method for controlling the shut down of the computer system by using the service utilization information collection apparatus is now explained.

In a group of computers (computer system) comprising two or more computers, when one or more of the computers provide services to one or more other computers, if the server which is the service providing computer is first shut down, the client cannot thereafter use the service and therefore inconvenience may occur.

Accordingly, when the computer is to be shut down, the service utilization information collection apparatus of the present invention may be used to determine the service utilization relation between the computers to determine the sequence of shut down of the computers. However, in some cases, the dependency relation is looped and the sequencing may not be attained. In such a case, a priority is imparted to each dependency relation and the sequence of shut down is determined by neglecting the low priority relation.

Figure 19:
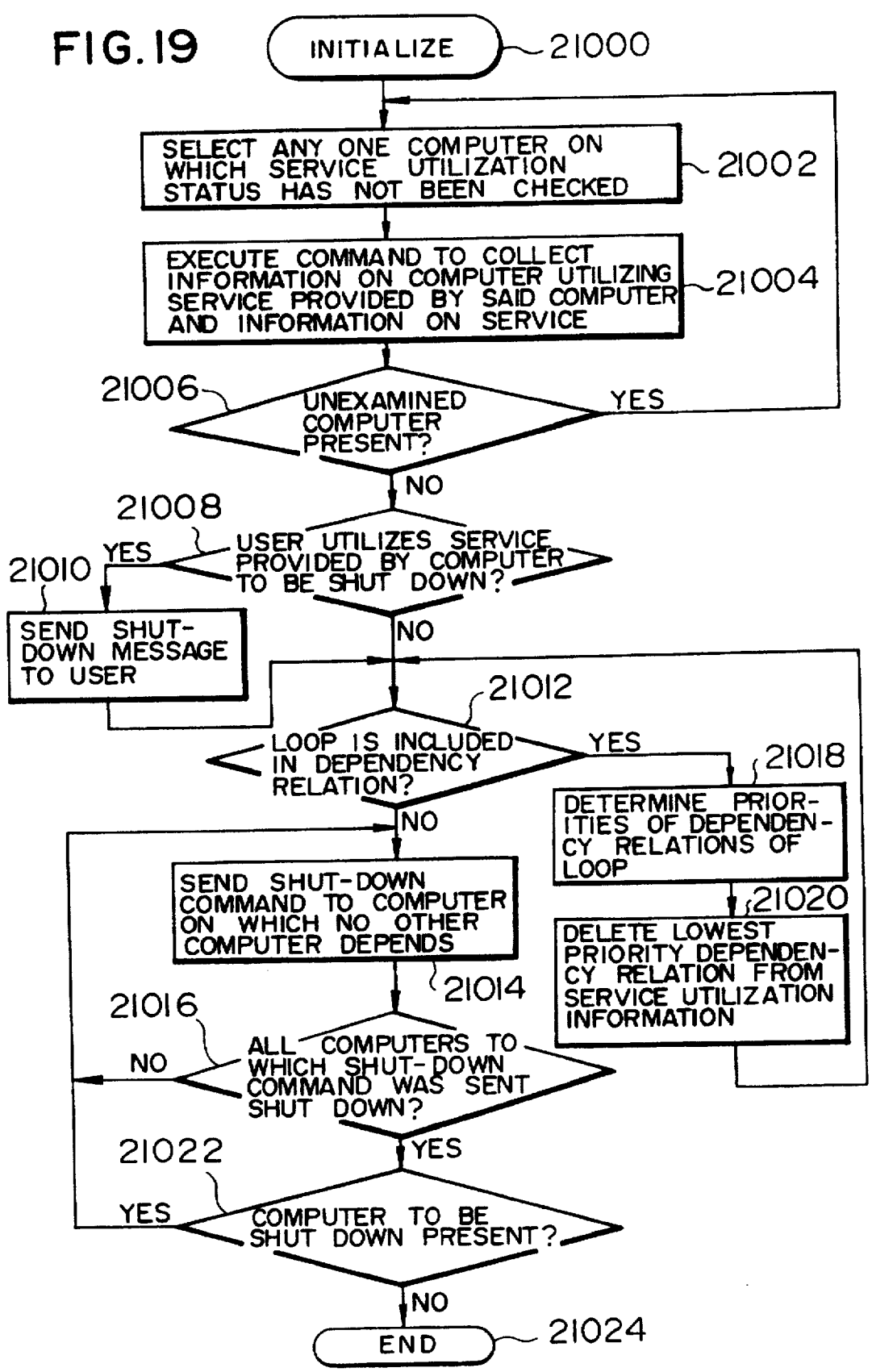
FIG. 19 shows a shut down control procedure of the computer system by using collection apparatus for the service utilization information.

FIG. 19 shows a flow of the process to control the shut down. The process of FIG. 19 may be conducted in any one of the computers of the computer system to be shut down.

After the initialization 21000, each computer is examined. Any one computer is selected 21002 and a command to collect the service utilization information of that computer is executed 21004 to acquire a collection result. If there is unexamined computer 21006, the process is repeated from the step of selecting the computer 21002. In this manner, the service utilization information are collected for all computers.

Whether or not there is a user who is utilizing the computer which is to be shut down is determined 21008, and if there is a user, a message to inform the shut down is sent to the user 21010.

Then, the dependency relation loop is searched from the service utilization information previously examined, and if it is found 821012, the priorities of the dependency relations of the loop are determined 21018 and the low priority dependency relations are deleted from the service utilization information 21020. The priorities are previously imparted.

When the dependency relation loop is no longer present in the service utilization information 21012, there must be a computer which does not depend on any computer and a shut down command is sent to that computer 21014 and that computer checks if the shut down is completed 21016. If the shut down is not completed, the process is repeated from the step of sending the shut down command 21014.

When the computer to which the shut down command has been sent completes the shut down 21016, whether or not the computer which was initially intended to be shut down completes the shut down is determined 21002, and if there is still a computer which is not yet shut down, the process is repeated from the step 21014 of sending the shut down command to the computer on which no other computer depends 21024.

The process of FIG. 19 may be provided as a program or implemented by a shell script.

A method for communicating between programs of the present embodiment is now explained.

In the service utilization information collection method and apparatus of the present embodiment, communication is made between a plurality of computers connected through a communication line. Accordingly, work efficiency may change depending on how the communication is made.

For example, a most simple way is to repeat one-to-one communication for each communication. Referring to FIG. 2, when the one-to-one communication scheme is used, the service monitor 1112 repeats the work of sequentially sending the requests to the local service monitors 1114-1, 1114-2 and 1114-3 and receiving the replies. Accordingly, if the work by each local service monitor takes a long time, a wait time of the service monitor is long and the efficiency is lowered.

On the other hand, a multi-processor communication method may be used. Namely, the communication between the service monitor 1112 and the local service monitors 1114-1, 1114-2 and 1114-3 are concurrently conducted. As the multi-processor communication method, a multi-cast method and a broadcast method are known.

In the multi-cast method, a multi-cast address in which one computer address (IP address) is allocated to a computer group comprising one or more computers is used to conduct the multi-processor communication. Namely, when data is sent to one multi-cast address, the data is delivered to all computers of the group. The multi-cast must be supported by a computer kernel.

On the other hand, the broadcast method sends data concurrently to all computers connected to a communication line. Accordingly, the data may be delivered even to unrelated computers and unnecessary data may be discarded at each computer.

By using the multi-processor communication method in the communication between the service monitor 1110 and the local service monitors 1114-1, 1114-2 and 1114-3, the processes in the respective local service monitors may be conducted in parallel.

A communication protocol is briefly described.

In the service utilization information collection apparatus of FIG. 2, the communication is made between the user command 1110 and the service monitor 1112 (1334-1, 1334-2) and between the service monitor 1112 and the local service monitors 1114-1, 1114-2 and 1114-3 (1336-1, 1336-2, 1336-3, 1336-4, 1336-5, 1336-6).

Both may use the same communication protocol or different communication protocols. In the present embodiment, both use the same communication protocol. As described above, the socket is used as the communication interface to assure the arrival of the transmitted character string.

In the communication by the present apparatus, there are a client issuing a request and a sever receiving the request. For example, when the communication is made between the user command and the service monitor, the user command is the client and the service monitor is the server. When the communication is made between the service monitor and the local service monitor, the service monitor is the client and the local service monitor is the server.

In the present apparatus, the communication between the client and the server comprises requests 1334-1, 1336-1, 1336-2 and 1336-3 from the client to the server and replies 1334-2, 1336-4, 1336-5 and 1336-6 from the server to the client. Each communication need only to deliver the character string and two-byte character or binary data is not considered in the present embodiment. The data to be delivered comprises only one-byte code alphanumeric characters which are partitioned by line by a carriage return mark. When a request is to be sent from the client to the server, the content of the request is only the service utilization information collection request. The reply from the server to the client includes an answer to the requested result and an error code. In order to indicate this difference, three-digit numerals are added to the beginning of each line of the data to be transmitted to indicate whether it is a request or an error by the first digit, and the content of the request result or error by the remaining two digits.

For example, when the first digit indicates the request, the remaining two digits are for ID for indicating the content of service issuing the service utilization information collection information, and when the first digit indicates the error, the remaining two digits are for error code. If the line is to indicate the result, the content of the data is included in the fourth digit et seq. Since the data may extend over a plurality of lines, a line indicating the end of line is sent following to the last line of the data. This may be blank data or specific digits for the first three digits of the line.

Figure 20:
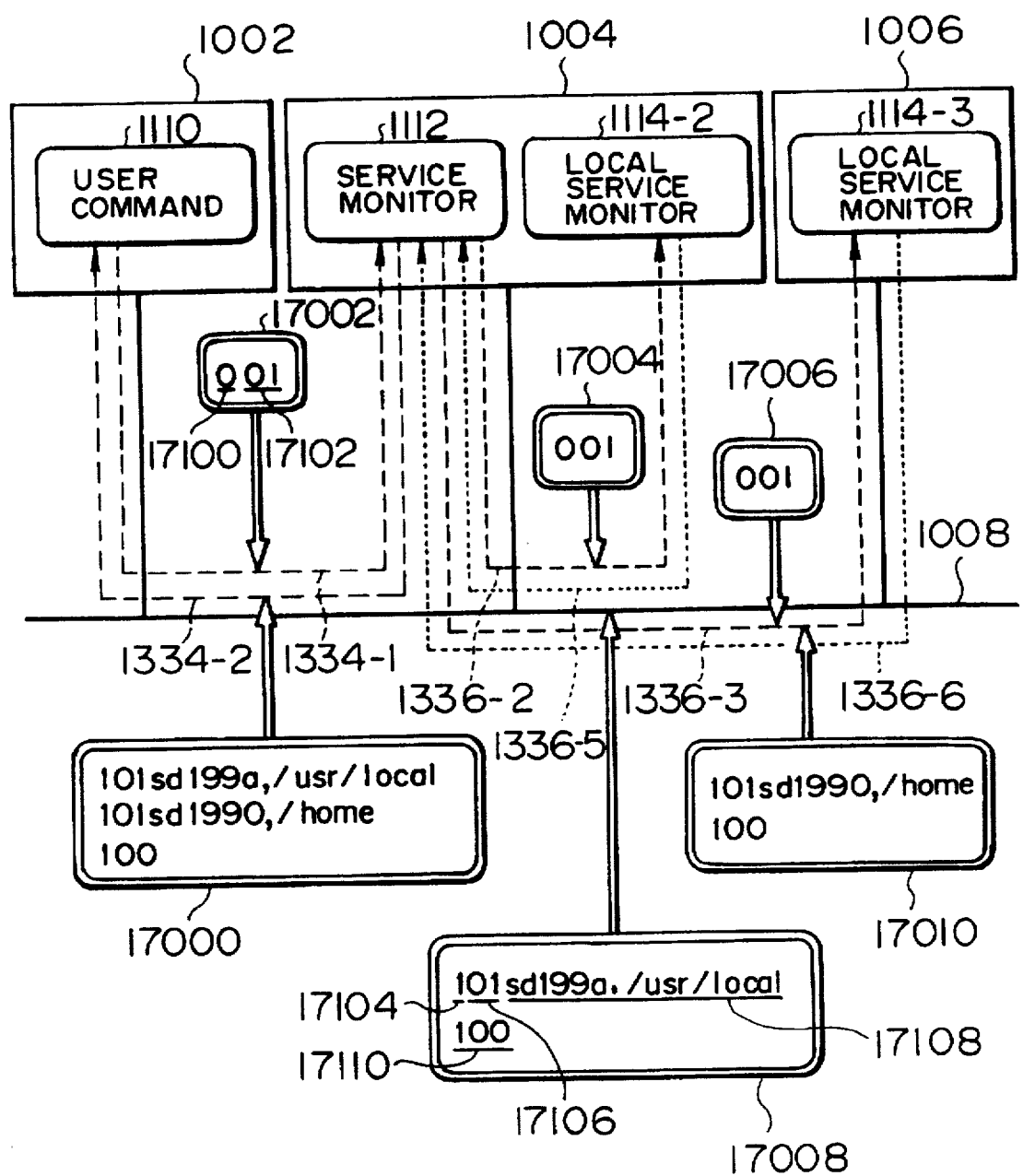
FIG. 20 shows data transmitted and received in communication.

FIG. 20 shows an example of a character string sent and received between the client and the server when the service utilization information on the NFS is collected in a similar system configuration to that of FIG. 2.

In FIG. 20, in the request 1334-1 from the user command 1110 to the service monitor 1112, '001' 17002 which is a set of '0' 17100 indicating the request and '01' 17102 indicating the NFS is delivered. The service monitor 1112 delivers the received requests 17004, 17006 to the local service monitors 1114-2 and 1114-3 (1336-2, 1336-3) and the replies 17008, 17010 for the NFS are sent from the respective local service monitors 1114-2 and 1114-3 to the service monitor 1112 (1336-5, 1336-6). The character string 17008 which is sent back as the result comprises '1' 17104 indicating the result and '01' 17106 indicating the NFS, and a line 17110 comprising only '100' indicating the end of result is sent following to the last line of the result.

When a too long of a time period is required for the server to respond to the request issued by the client, there is a possibility that some problem may have occurred in the server and a measure to terminate the request or resend the request by the client may be required.

Access control is now explained.

In FIG. 2, the service monitor 1112 and the local service monitors 1114-1, 1114-2 and 1114-3 accept the request from other computer and send back the reply. However, the collected information may include those information which should not be readily disclosed.

For example, where the NIS server names and the domain names are to be collected, someone may attempt to utilize the information to break the security of the NIS system to log in the computer in the NIS domain without authorization. Accordingly, a mechanism which restricts the computer issuing the request and does not accept the service utilization information collection request from other computers is required.

As one method therefor, a computer group which can permit the request may be defined. For example, where a computer connected to the communication line 1008 uses the NIS, only the computers in the NIS domain are permitted, or only the computer in a certain system are permitted, or a list of the computers which are permitted to issue a request to the service monitor 1112 and the local service monitors 1114-1, 1114-2 and 1114-3 is provided. Alternatively, the user identification method may be used such as entering a password before issuing a request.

Reliability is now discussed.

In the service utilization information collection apparatus shown in FIGS. 2, 3 and 4, even if the local service monitor is shut down, damage is small because only the service monitor cannot acquire the information on the computer of the shut down local service monitor when the service monitor relays the request from the user command. When the computer itself is shut down, no service can be used and no problem occurs.

However, when the service monitor is shut down, the information on not only the computer on which the service monitor is operated but also on all other computers is not acquired. It is therefore desirable to install a plurality of service monitors such that when one service monitor is shut down, an alternate service monitor is started.

In the service utilization information collection apparatus of the ordinary check shown in FIG. 2, no problem arises by simply installing a plurality of service monitors, but in the service utilization information collection apparatus of the periodic check shown in FIG. 3 and the service utilization information collection apparatus of the event driven check shown in FIG. 4, it is required that the local service monitor can find the alternate service monitor when the current service monitor is shut down because data is sent from the local service monitor to the service monitor periodically or is event driven.

To this end, a list of the computers on which the service monitors are operated is provided in each of the local service monitors and the data transfer is tried to one candidate and retried to the next candidate if it fails or a broadcast message is sent to identify the server. Further, it is required to operate a plurality of service monitors concurrently and communicate therebetween to keep the data consistency.

The user command is now described.

Figure 21:
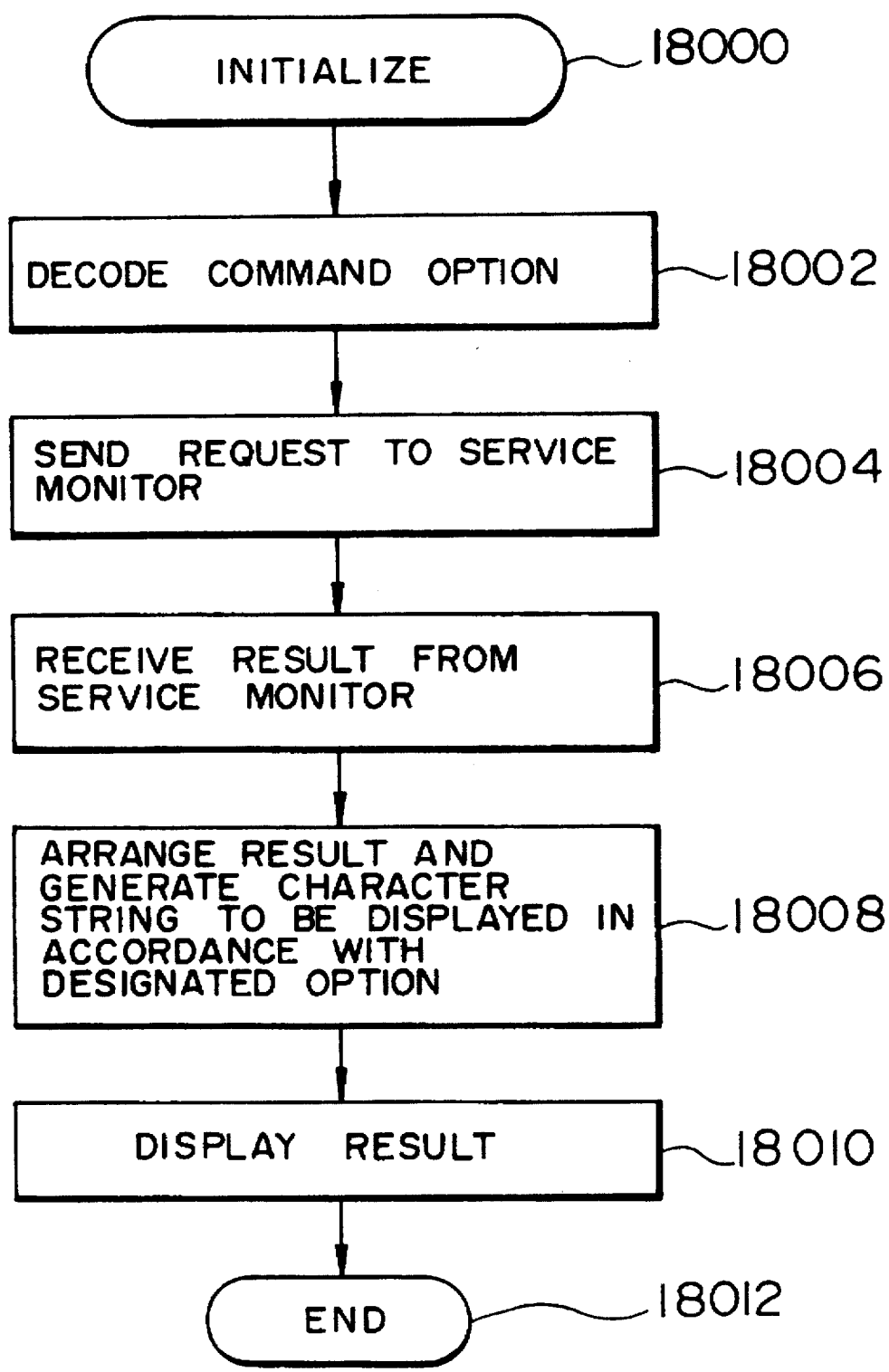
FIG. 21 shows a flow chart for a user command.

FIG. 21 shows a flow of the process of the user command. The flow of the process is applicable to any of the systems of FIGS. 2, 3 and 4.

After the initialization 18000 and the command option decoding 18002 of the user command, a request is sent to the service monitor in accordance with the computer name and the service name received from the user 18004. Then, the result from the service monitor is received 18006 and arranged 180008 and it is sent back to the user as the character string 18010. The character string to be sent back may comprise only the computer name or may further include information on the service. The information on the service may be the directory name of the NFS server which the client mounts for the NFS service. Only the computer name may be sent back by designating the option.

Service is now described.

The method for designating the service to collect the information is so far to designate, for example, "telnet service provided by a particular computer". Alternatively, "Entire service provided by a particular computer" or "services provided by a particular computer group" may be designated. Namely, one or more computer and more than one service may be designated and the services provided by the computer group are collectively handled as one service. Thus, the information on several service may be collectively collected and the user operability is improved. Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. In a computer system including a plurality of computers interconnected through a network in which at least one of said plurality of computers provides at least one service to the others of said plurality of computers, a computer system shut-down method for controlling the shut down of at least one of said plurality of computers in said computer system comprises the steps of:

inputting any identification ID of said service from an input device;

transmitting the input ID to said plurality of computers;

determining whether said service is utilized in each of said computers based on the transmitted service ID;

transmitting the service utilization information on the basis of the determination to said network when each of said computers is determined to utilize the service;

receiving the service utilization information on the network;

outputting the service utilization information to an output device;

collecting information regarding each of said plurality of computers utilizing the service provided by said at least one computer and information regarding the service for each of said plurality of computers in said computer system;

referencing the collected service utilization information, and, if there is a computer which utilizes said service provided by any computer to be shutdown, informing the computer utilizing said service of the shutdown;

determining whether or not there is a dependency relation loop between said plurality of computers, and, if there is a dependency relation loop, suppressing utilization of the service having a predetermined lowest priority dependency relation; and shutting down a specific one of said plurality of computers on which no other computer depends.

2. In a computer system including a plurality of computers interconnected through a network in which at least one of said plurality of computers provides at least one service to the others of said plurality of computers, an apparatus for controlling the shut down of at least one of said plurality of computers in said computer system, comprising:

input means for inputting an identification ID of said service from an input device;

means for transmitting the input ID to said plurality of computers;

means for determining whether said service is utilized in each of said plurality of computers based on the transmitted service ID;

means for transmitting the service utilization information to said network when said service is utilized in each of said plurality of computers according to said determining means; and means for receiving the service utilization information on the network;

means for outputting the service utilization information to an output device;

means for examining a dependency relationship between said plurality of computers and suppressing utilization of the service having a predetermined lowest priority dependency relation; and means for sequentially shutting down said plurality of computers starting with the computer whose service is not utilized by any other of said plurality of computers.

3. A computer system shutdown control apparatus according to claim 2, further comprising:

user command processing means for issuing a collection request for the service utilization information which includes a name of at least one of said computers and at least one service provided by said computer, receiving the collected result and displaying the result;

service monitor means operating on at least one of said computers for accepting the collection request from said user command means, transmitting the collection request to some or all of said plurality of computers in said computer system, receiving results from the other computers and sending the results to said user command means; and local service monitor means operating in all of said plurality of computers in said computer system for collecting information in respective ones of said plurality of computers in accordance with the collection request when the collection request from the service monitor is received and sending the collected result to said service monitor means.

4. A computer system shutdown control apparatus according to claim 3, wherein said local service monitor means collects the service utilization information by reading a file which stores names of computers that provide services which the respective computer utilizes and information regarding the services utilized therein.

5. A computer system shutdown control apparatus according to claim 3, wherein said local service monitor means collects the service utilization information by executing a command or function for collecting names of computers that provide services which the respective computer utilizes and information regarding the services utilized therein.

6. A computer system shutdown control apparatus according to claim 3, further comprising means for examining a status of a communication path by using a command or function for examining the status of the communication path between respective ones of said plurality of computers and others of said plurality of computers and determining a name of the computer of the communication path which meets the previously designated condition and a name of a service provided through the communication path which is given by a resource used by the communication path.

7. A computer system shutdown control apparatus according to claim 2, further comprising:

user command processing means for issuing a collection request for the service utilization information which includes a name of at least one of said computers and at least one service provided by said computer, receiving the collected result and displaying the result;

service monitor means operating on at least one of said computers for accepting the collection request from said user command means, transmitting the collection request to some or all of said plurality of computers in said computer system, extracting information regarding any of said plurality of computers utilizing said at least one service of the computer which is designated by the collection request from the service utilization information and sending the extracted information to said user command means; and local service monitor means operating on all of said plurality of computers in said computer system for periodically collecting information in respective ones of said plurality of computers in accordance with collection request when the collection request from the service monitor is received and sending the collected information to said service monitor means;

wherein said service monitor means receives names of those of said plurality of computers which provide the services utilized by said plurality of computers and information regarding the services periodically sent from said local service monitor means and storing the received information as the service utilization information.

8. A computer system shutdown control apparatus according to claim 7, wherein said local service monitor means transmits a change to said service monitor if the change from the previously collected information is included when the information is collected and sending all collected information to said service monitor means at every several information collection cycles whether or not the change is included therein.

9. A computer system shutdown control apparatus according to claim 7, wherein said local service monitor means determines the presence or absence of a change of a file storing the name of computers that provide the service utilized by respective ones of said plurality of computers and information on the service utilized, sends the change to said service monitor if the change is included therein and sends the entire file to said service monitor at every several information collection operations if the change is not included therein.

10. A computer system shutdown control apparatus according to claim 7, wherein said local service monitor means executes a command or function for collecting the name of computers that provide the service utilized by respective ones of said plurality of computers and information on the service utilized, sends the execution result of the command or function to said service monitor means when the collected information includes a change from the previously collected information, and send the execution result of the command or function to said service monitor means at every several information collection operations when the change is not included therein.

11. A computer system shutdown control apparatus according to claim 2, further comprising:

user command processing means for issuing a collection request for the service utilization information which includes a name of at least one of said computers and at least one service provided by said computer, receiving the collected result and displaying the result;

service monitor means operating on at least one of said computers for accepting the collection request from said user command means, transmitting the collection request to some or all of said plurality of computers in said computer system, extracting information regarding any of said plurality of computers utilizing said at least one service of the computer which is designated by the collection request from the service utilization information and sending the information to said user command means; and command or function processing means operating on all of said plurality of computers in said computer system for modifying a configuration of the services for which the information is to be collected and sending a change to said service monitor means in accordance with the modification;

wherein said service monitor means receives the change of the configuration of the services sent from said command or function processing means to change the service utilization information.

* * * * *